(12) United States Patent
Andros et al.

(10) Patent No.: US 8,571,885 B2
(45) Date of Patent: Oct. 29, 2013

(54) METHOD AND SYSTEM FOR INFORMATION RETRIEVAL AND TRANSFER

(76) Inventors: William T. Andros, Palm Beach Gardens, FL (US); Alan Redmon, Stuart, FL (US)

(*) Notice: Subject to any disclaimer, the term of this patent is extended or adjusted under 35 U.S.C. 154(b) by 645 days.

(21) Appl. No.: 12/534,591

(22) Filed: Aug. 3, 2009

(65) Prior Publication Data
US 2010/0121656 A1    May 13, 2010

Related U.S. Application Data

(63) Continuation-in-part of application No. 09/751,815, filed on Dec. 29, 2000, now abandoned.

(51) Int. Cl.
*G06Q 10/00* (2012.01)
*G06Q 50/00* (2012.01)

(52) U.S. Cl.
USPC ........................................ 705/2; 705/3; 705/4

(58) Field of Classification Search
USPC .................... 705/2–4; 379/142.17
See application file for complete search history.

(56) References Cited

U.S. PATENT DOCUMENTS

| | | | | |
|---|---|---|---|---|
| 5,675,637 A | * | 10/1997 | Szlam et al. | 379/142.17 |
| 5,832,447 A | * | 11/1998 | Rieker et al. | 705/2 |
| 5,995,939 A | * | 11/1999 | Berman et al. | 705/3 |
| 6,012,035 A | * | 1/2000 | Freeman et al. | 705/2 |
| 2004/0148203 A1 | * | 7/2004 | Whitaker et al. | 705/4 |
| 2005/0080771 A1 | * | 4/2005 | Fish | 707/3 |

* cited by examiner

*Primary Examiner* — Neha Patel
(74) *Attorney, Agent, or Firm* — Novak Druce Connolly Bove + Quigg LLP

(57) ABSTRACT

A method for providing medical insurance information corresponding to a consumer of medical services can include receiving consumer medical insurance information from a consumer. This information includes one or more identity fields. A request is sent to network sources of identity information for the consumer, the requests including one or more of the identity fields. The identity information that is received is compared to the consumer medical insurance information using matching rules to store data which satisfies the rules. The identity data which satisfies the matching rules is used to generate requests for insurer medical insurance information. The insurer information is compared to the consumer medical insurance information using matching rules to store only data which satisfies the matching rules. A processor can be used to generate different permutations and combinations of the data for the identity requests and for the insurer requests until a satisfactory response has been received.

4 Claims, 32 Drawing Sheets

FIG. 4

TevixMD Web Wiszard - Web Page Dialog

| 1. Login | 2. InstantDemographics | 3. Guarantor | 4. InstantBenefits | 5. New Patient Form | 6. Text Tr |

Please enter your Tevix username and password and then click on the Next button below.

Username:

Password:

*TevixMD Web Wizard Version 2.0.113- © Copyright 1999-2000 Tevix, Inc. All rights reserved.*

Start Over    <<Back    Next>>

FIG. 6

TevixMD Web Wizard - Web Page Dialog

1. Login | 2. InstantDemographics | 3. Guarantor | 4. InstantBenefits | 5. New Patient Form | 6. Tex Enter the patient's SSN and click on the Get Patient button. If demographics are not available, enter the patient data below.

Enter patient Social Security Number (SSN)

SSN: [111-11-111]   [Get Patient]

Patient Demographics

First: [Sample]   Middle: [T]   Last: [Patient]

Address: [1111 Sample Lane]

City: [Anywhere]

State: [ST]

Zip: [111111]

DOB: [11] / [11] / [1688]

Home Phone: [(555)555-5555]   Work Phone: [(444)444-4444]

Sex: ○ Female  ⊙ Male

*powered by* eDATA.com

[Start Over]   [<<Back]   [Next>>]

TevixMD Web Wizard - Web Page Dialog

1. Login | 2. InstantDemographics | 3. Guarantor | 4. InstantBenifits | 5. New Patient Form | 6. Te If the patient is the Guarantor, click on the Next button below. Otherwise, enter the guarantor's SSN and click on the Get Guarantor button.

Enter the patient's Social Security Number (SSN)

SSN: 111-11-111    [Get Guarantor]

Guarantor Demographics

First: Sample    Middle: T    Last: Patient
Address: 1111 Sample Lane
City: Anywhere
State: ST
Zip: 111111
DOB: 11 / 11 / 1688
Home Phone: (555)555-5555    Work Phone: (444)444-4444
Sex: ○ Female  ● Male

[Start Over]    [<<Back]    [Next>>]

*powered by* eDATA.com

FIG. 12

208.63.16.100 - TERMINAL SERVICES CLIENT (ALAN FRAME)

NEW APPOINTMENT/RESERVED BLOCK eVERIFY WIZARD

1. ENTER PATIENT SSN | 2. VERIFY PATIENT | 3. PATIENT COVERAGE

SOCIAL SECURITY NUMBER: 505 78 6340

PATIENT: ANDROS WILLIAM T.

AETNA/US HEALTHCARE HMO
GROUP: 6977771-011-00108
ID: 505-78-6340

PERCENTAGES AND COPAYMENTS

| | PARTICIPATING |
|---|---|
| PERCENT | COPAY |
| 100 | $10.00 |
| 100 | $0.00 |

MEDICAL
SKILLED NURSING FACILITY

UPDATE LIST

POWERED BY
TEVIXMD & eDATA

☐ SHOW ALL PATIENTS

CANCEL | <<BACK | FINISH

*FIG. 13A*

TEVIXMD WEB WIZARD - WEB PAGE DIALOG

GUARANTOR | 4. INSTANTBENEFITS | 5. NEW PATTERN FORM | 6. TEVIX TRANSFER AGENT

THE PATIENT'S BENEFITS ARE LISTED BELOW. IF THE BENEFITS ARE NOT CORRECT OR IF YOU ENCOUNTERED AN ERROR, CLICK ON THE BACK BUTTON TO VERIFY PAYOR SPECIFIC DATA AND RETRY THE REQUEST.

— PATIENT BENEFITS —

AETNA US HEALTHCARE (R) ELIG INQUIRY

PATIENT IS ELIGIBLE

PROVIDER INFORMATION
NAME:          ABINGTON MEMORIAL HOSPIT
PROVIDER ID:   1403

MEMBER INFORMATION
NAME:               REDMON, WENDY M
SSN:                261950808
GROUP/POLICY ID     069776101000102
GROUP/POLICY NAME:  ERNST YOUNG LLP
GENDER:             FEMALE
DATE OF BIRTH:      02/13/1968
PLAN EFFECTIVE DATE: 01/01/2000

START OVER    <<BACK    NEXT>>

FIG. 13C

TEVIXMD WEB WIZARD - WEB PAGE DIALOG

| GUARANTOR | 4. INSTANTBENEFITS | 5. NEW PATTERN FORM | 6. TEVIX TRANSFER AGENT |

THE TEVIX TRANSFER AGENT (TTA) CAN AUTOMATICALLY TRANSFER THE PATIENT DEMOGRAPHIC AND BENEFIT INFORMATION YOU HAVE RETRIEVED DIRECTLY TO YOUR PRACTICE MANAGEMENT SYSTEM (PMS).

SELECT YOUR PRACTICE MANAGEMENT SYSTEM AND CLICK ON THE SEND BUTTON BELOW

- ☐ ECLIPSYS
- ☐ E-MDS: topsBILL
- ☐ E-MDS: topsSCHEDULE
- ☐ EPIC
- ☐ IDX
- ☐ INFOMEDTRICS
- ☐ MCKESSON HBOC

- ☐ MEDIC
- ☐ MEDICAL MANAGER
- ☐ MEDISOFT
- ☐ MEDITECH
- ☐ MEDWARE
- ☐ MILLBROOK
- ☐ PMS

- ☐ RAINTREE
- ☐ RIVERS
- ☐ SAP
- ☐ SMS
- ☐ OTHER

[SEND DATA TO PMS]

[START OVER]   [<<BACK]   [NEXT>>]

FIG. 14

Patient is Eligible

PROVIDER INFORMATIONName: HOSPITALProviderID:1403

MEMBER INFORMATIONName:Smith,Mary MSSN:123456789Group/PolicyID: 1234567890Group/PolicyName:XXXXXX Gender:FemaleDate of Birth:01l111968Plan EffectiveDate: 01/01/2000

Eligibility & Benefit InformationInsuranceType: (POS)Coverage Level:Employee and SpouseEntered 1stDOS:12/26/2000Entered Last DOS:12/26/2000PCPEffective Date: 02/01/1998PCPName: Smith,Tom STelephone Number:(123) 123-4567Telephone Number: (123)1234569

ServiceType:Hospital - OutpatientDEDUCTIBLEMonetary Amount: $ 300.00

Coverage Level: Employee and SpouseNetwork Indicator:Out-Of-Plan-Network

CO-INSURANCEPercentage Rate: 70%Coverage Level:Employee and SpousePlan Coverage Description:FOR HSP EXPNetwork Indicator: Out-Of-Plan-Network Percentage Rate:100%CoverageLevel: Employee and SpousePlanCoverage Description:
     HOSPITAL COINSURANCENetwork Indicator:In-Plan-Network LIMITATIONSCALL FOR AUTHORIZATIONNetwork Indicator:In-Plan-Network BENEFIT DESCRIPTIONNo,Prov IsNot in Mbr's Ntwk ServiceType: Diagnostic MedicalDEDUCTIBLEMonetaryAmount: $ 300.00CoverageLevel: Employee and SpouseNetwork Indicator: Out-Of-Plan-Network CO-INSURANCEPercentageRate: 70%CoverageLevel:Employee and SpousePlan Coverage Description: DIAGNOSTIC XRAY & LAB EXPENSESNetwork Indicator: Out-Of-Plan-Network Percentage Rate:100%Coverage Level: Employeeand SpouseNetwork Indicator; In-Plan-Network

FIG. 15A

MEMBER INFORMATIONMemberNumber:
1234567890123456Name:SMITH,JOAN
M.Date of Birth:1/1/1973Gender:FMember
Effective Date:05/01/2000MemberExpiration
Date:09/30/2001BPL Code:99999

PRIMARY CARE INFORMATION

COPAY INFORMATIONEffective Date:
05/01/l998Expiration Date:09/30/2001Code -
MH/GRP:$10.00Code MH/IPT:$100.00Code -
PCPOV:$15.00Code ER:$50.00Code-URGI:
$25.00code - PT:$20-00code - OT:
$20.00code - DME:$50.00code -RX:
$8.00Code-IP:$250.00Code - RX-OTH:
$13.00code - RX-PRF:$8.00Code -RX T3:

BENEFIT DESCRIPTIONNo,ProvIsNot in
Mbr's Ntwk

ServiceType:Professional(Physician)Visit-
OfficeLIMITATIONSCOPAY WITHPCP
REFERRALONLYDEDUCTIBLEMonetary
Amount:$300.00Coverage Level:Employee
andSpouseNetworkIndicator:Out-Of-Plan-
Network CO-INSURANCEPercentageRate:
70%Coverage LevelEmployeeand
SpouseNetworkIndicator:Out-Of-Plan-Network Percentage Rate: 100%CoverageLevel:
Employee and SpousePlanCoverage
Description:
  OFFICE VISIT COINSURANCENetwork
Indicator:In-Plan-Network CO-PAYMENTMonetary Amount:$10.00Plan
Coverage Description:OFFICE VISIT
COPAYNetworkIndicator:In-Plan-Network BENEFIT DESCRIPTIONNo,Prov Is Not in
Mbr's Ntwk

*FIG. 15B*

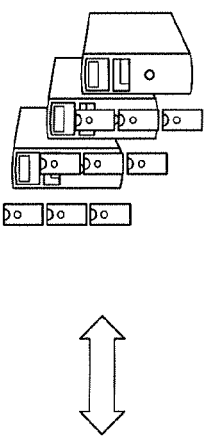
FIG. 16A1

FROM FIG.16A1

(c) COMPARE CONSUMER DATA FROM PATIENT TO CONSUMER DATA FROM NETWORK LOCATIONS IDENTITY CHECK

| NETWORK LOCATION | SSN | DATE OF BIRTH | FIRST NAME | MIDDLE NAME | LAST NAME | ADDRESS 1 | APT | CITY | STATE | ZIP | PHONE | ALIAS | RELIABILITY |
|---|---|---|---|---|---|---|---|---|---|---|---|---|---|
| PATIENT DATA | 505-78-6330 | JAN 8, 1958 | BOB | WALKER | DOE | 111 MEMORY LANE | 322 | JUPITER | FLORIDA | 33444 | 561-743-0444 | | HIGH |
| 1 | 505-78-6330 | JAN 8, 1958 | WALKER | ROBERT | DOE | 111 MEMORY LANE | 322 | JUPITER | FLORIDA | 33444 | 561-743-0444 | BOB, ROB | HIGH |
| 2 | 505-78-6330 | JAN 8, 1958 | ROBERT | WALKER | DOE | 111 MEMORY LANE | 322 | JUPITER | FLORIDA | 33444 | 561-743-0444 | ROB, ROBB | MEDIUM |
| 3 | 505-78-6330 | JAN 8, 1958 | ROBERT | WALKER | DOE | 111 MEMORY LANE | 322 | JUPITER | FLORIDA | 33444 | 561-743-0444 | R.WALKER | HIGH |
| 4 | 505-78-6330 | JAN 8, 1958 | ROBERT | WALKER | DOE | 111 MEMORY LANE | | JUPITER | FLORIDA | 33444 | 561-743-0444 | ROBB | LOW |
| 5 | 454-96-9999 | APR 12, 1940 | ROBERT | TOM | DOE | 334 JOHN ROAD | | LINCOLN | NEBRASKA | 44560 | 402-333-2323 | ROB, BOB, ROBB | LOW |
| 6 | 505-78-6330 | JAN 8, 1958 | ROBERT | WALKER | DOE | 253 SET STREET | 563 | JUPITER | FLORIDA | 35241 | 561-743-5230 | R.WALKER | HIGH |
| 7 | 505-78-6330 | JAN 8, 1958 | BOB | WALKER | DOE | 111 MEMORY LANE | 322 | JUPITER | FLORIDA | 33444 | 561-743-0444 | BOB, ROB, ROBB | HIGH |
| 8 | 505-78-6330 | MAR 13, 1944 | JOHN | OWEN | THOMPSON | 22 SOUTH STREET | | ST. LOUIS | MISSOURI | 56223 | 306-256-5656 | JONATHAN | LOW |
| 9 | 505-78-6331 | APR 23, 1964 | SUE | SALLY | DOE | 111 MEMORY LANE | 322 | JUPITER | FLORIDA | 33444 | 561-743-0444 | | MEDIUM |

FIG. 16A2

(d) DETERMINE CORRECTED CONSUMER DATA

| NETWORK LOCATION | SSN | DATE OF BIRTH | FIRST NAME | MIDDLE NAME | LAST NAME | ADDRESS 1 | APT | CITY | STATE | ZIP | PHONE | ALIAS | RELIABILITY |
|---|---|---|---|---|---|---|---|---|---|---|---|---|---|
| PATIENT DATA | 505-78-6330 | JAN 8, 1958 | BOB | WALKER | DOE | 111 MEMXRY LANE | 322 | JUPITER | FLORIDA | 33444 | 561-743-0444 | | HIGH |
| 1 | 505-78-6330 | JAN 8, 1958 | WALKER | ROBERT | DOE | 111 MEMORY LANE | 322 | JUPITER | FLORIDA | 33444 | 561-743-0444 | BOB, ROB | HIGH |
| 2 | 505-78-6330 | JAN 8, 1958 | ROBERT | WALKER | DOE | 111 MEMORY LANE | 322 | JUPITER | FLORIDA | 33444 | 561-743-0444 | ROB, ROBB | MEDIUM |
| 3 | 505-78-6330 | JAN 8, 1958 | ROBERT | WALKER | DOE | 111 MEMORY LANE | 322 | JUPITER | FLORIDA | 33444 | 561-743-0444 | R.WALKER | HIGH |
| 4 | 505-78-6330 | JAN 8, 1958 | ROBERT | WALKER | DOE | 111 MEMORY LANE | | JUPITER | FLORIDA | 33444 | 561-743-0444 | ROBB | LOW |
| 6 | 505-78-6330 | JAN 8, 1958 | ROBERT | WALKER | DOE | 253 SET STREET | 563 | JUPITER | FLORIDA | 35241 | 561-743-5230 | R.WALKER | HIGH |
| 7 | 505-78-6330 | JAN 8, 1958 | BOB | WALKER | DOE | 111 MEMORY LANE | 322 | JUPITER | FLORIDA | 33444 | 561-743-0444 | BOB, ROB, ROBB | HIGH |
| CORRECTED | 505-78-6330 | JAN 8, 1958 | ROBERT | WALKER | DOE | 111 MEMORY LANE | 322 | JUPITER | FLORIDA | 33444 | 561-743-0444 | BOB, ROB, ROBB, WALKER | |

(e) CREATE A SUPERSET OF CONSUMER DATA.

| SSN | DATE OF BIRTH | FIRST NAME | MIDDLE NAME | LAST NAME | ADDRESS 1 | APT | CITY | STATE | ZIP | PHONE | ALIAS |
|---|---|---|---|---|---|---|---|---|---|---|---|
| 505-78-6330 | JAN 8, 1958 | ROBERT | WALKER | DOE | 111 MEMORY LANE | 322 | JUPITER | FLORIDA | 33444 | 561-743-0444 | BOB, ROB, ROBB, WALKER |
| 505-78-6331 | | BOB | ROBERT | | 253 SET STREET | 563 | JUPITER | FLORIDA | 35241 | 561-743-5230 | ROB |
| 505-78-6330 | | ROBB | | | | | | | | | ROBB |
| 505-78-6330 | | ROB | | | | | | | | | |
| 505-78-6330 | | WALKER | | | | | | | | | WALKER |
| 505-78-6330 | | RIBERT | | | | | | | | | |
| 505-78-6330 | | | | | | | | | | | |

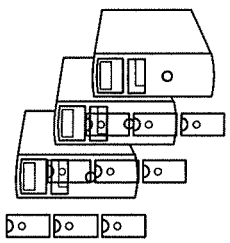
FIG. 16B2

NETWORK LOCATIONS

SEND ADDITIONAL REQUESTS USING THE SUPERSET OF DATA IF A RESPONSE IS NOT RECEIVED (g)

Complete ONE of the Search Option Forms.
Then, click the Get Eligibility button below the Search Option Form you completed.
Payor: Florida BCBS   You must complete all fields in the search option form you use.

Search Option 1

Ins First Name  [                    ]
Ins Last Name   [                    ]
Ins DOB         [                    ]
(mm/dd/yyyy)
Ins ID          [                    ]
Date Of Service     [06/23/2009]
(mm/dd/yyyy)
End Date Of Service [06/23/2009]
(mm/dd/yyyy)

( Get Eligibility )   ( clear form )

Search Option 2

Ins ID              [SDE505786340]
Pt First Name       [Bob]
Pt Last Name        [Doe]
Pt DOB              [01/08/1958]
(mm/dd/yyyy)
Relation To Insured [Spouse  ◄►]
Date Of Service     [06/23/2009]
(mm/dd/yyyy)
End Date Of Service [06/23/2009]
(mm/dd/yyyy)

( Get Eligibility )   ( clear form )

FIG. 16C1

ABC Inc, Co

| [DEPENDENT] | Co-Insurance: | | Co-Insurance: | | Limitations: |
|---|---|---|---|---|---|
| Doe, Robert W | Hospital-Inpatient | /Visit | Health Benefit Plan Coverage | Deductible: | Health Benefit Plan Coverage |
| Member Identification Number: XJWH119XXXX | | | | Coverage Level: Individual | Remaining |
| Group Number: 99999 | 60.00% | | 80.00% | Health Benefit Plan Coverage | $1,969,336.90 |
| Prior Identifier Number: 505786340 | Out-Of-Plan-Network | | In-Plan-Network | Remaining | |
| Address: | | | Co-Insurance: | $0.00 | Out of Pocket (Stop Loss): |
| 111 Memory Lane | Co-Insurance: | | Hospital-Outpatient | In-Plan-Network | Coverage Level: Family |
| JUPITER, FL 33458-1066 | Psychiatric-Inpatient | /Visit | | Benefit Period | Health Benefit Plan Coverage |
| DOB: 01/08/1958 | | | 60.00% | | $6,000 |
| Gender: Male | 60.00% | | Out-Of-Plan-Network | Deductible: | In-Plan-Network |
| The Insured is a Dependent. | Out-Of-Plan-Network | | Out-Of-Plan-Network | Hospital-Inpatient | Benefit Period - Excludes Deductible |

(h) STORE DATA ITEMS FROM FIELDS OF RESPONCES

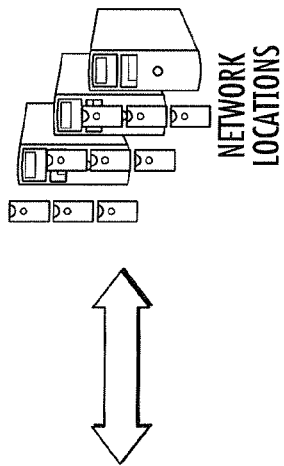
NETWORK LOCATIONS (i) REQUEST ADDITIONAL INSURANCE INFORMATION FROM A PLURALITY OF NETWORK LOCATIONS USING THE SUPERSET OF DATA Complete ONE of the Search Option Forms.
Then, click the Get Eligibility button below the Search Option Form you completed.
Payor: Florida BCBS  You must complete all fields in the search option form you use.

Search Option 1
Ins First Name: Rob
Ins Last Name: Doe
Ins DOB (mm/dd/yyyy): 01/08/1958
Ins ID: SDE505786340
Date Of Service (mm/dd/yyyy): 06/25/2009
End Date Of Service (mm/dd/yyyy): 06/25/2009
(Get Eligibility) (clear form)

Search Option 2
Ins ID: SDE505786340
Pt First Name: Robb
Pt Last Name: Doe
Pt DOB (mm/dd/yyyy): 01/08/1958
Relation To Insured: Spouse
Date Of Service (mm/dd/yyyy): 06/25/2009
End Date Of Service (mm/dd/yyyy): 06/25/2009
(Get Eligibility) (clear form)

Search Option 2
Ins ID: SDE505786340
Pt First Name: Bob
Pt Last Name: Doe
Pt DOB (mm/dd/yyyy): 01/08/1958
Relation To Insured: Spouse
Date Of Service (mm/dd/yyyy): 06/23/2009
End Date Of Service (mm/dd/yyyy): 06/23/2009
(Get Eligibility) (clear form)

RECEIVE INSURANCE INFORMATION FROM A PLURALITY OF NETWORK LOCATIONS

| | SSN | DATE OF BIRTH | FIRST NAME | MIDDLE NAME | LAST NAME | ADDRESS 1 | APT | CITY | STATE | ZIP | PHONE | ALIAS | COVERAGE |
|---|---|---|---|---|---|---|---|---|---|---|---|---|---|
| INSURANCE 1 | 505-78-6330 | JAN 8, 1958 | BOB | WALKER | DOE | 111 MEMXRY LANE | 322 | JUPITER | FLORIDA | 33444 | 561-743-0444 | | ACTIVE |
| INSURANCE 2 | 454-90-9999 | APRIL 19, 1940 | ROBERT | TOM | DOE | 334 JOHN ROAD | | LINCOLN | NEBRASKA | 44560 | 402-333-2323 | ROB, BOB, ROBB | ACTIVE |
| INSURANCE 3 | 505-78-6330 | JAN 8, 1958 | RIBERT | JOHN | DOE | 111 MEMORY LANE | | JUPITER | FLORIDA | 33444 | 561-743-0444 | R.WALKER | ACTIVE |
| INSURANCE 4 | 505-78-6330 | JAN 8, 1958 | BOB | WALKER | DOE | 111 MEMORY LANE | 322 | JUPITER | FLORIDA | 33444 | 561-743-0444 | BOB, ROB, ROBB | ACTIVE |
| INSURANCE 6 | 505-78-6330 | MAR 13, 1944 | JOHN | OWEN | THOMPSON | 22 SOUTH STREET | | ST. LOUIS | MISSOURI | 56223 | 306-256-5656 | JONATHAN | ACTIVE |
| INSURANCE 7 | 505-78-6330 | APR 23, 1964 | SUE | SALLY | DOE | 111 MEMORY LANE | 322 | JUPITER | FLORIDA | 33444 | 561-743-0444 | | NOT ACTIVE |

(k)

COMPARE DATA ITEMS FROM INSURANCE REPLY TO IDENTITY SUBSET OF FIELDS FROM CORRECTED DATA (NAME, DOB, SSN)

| | SSN | DATE OF BIRTH | FIRST NAME | MIDDLE NAME | LAST NAME | ADDRESS 1 | APT | CITY | STATE | ZIP | PHONE | ALIAS | COVERAGE |
|---|---|---|---|---|---|---|---|---|---|---|---|---|---|
| INSURANCE 1 | 505-78-6330 | JAN 8, 1958 | BOB | WALKER | DOE | 111 MEMXRY LANE | 322 | JUPITER | FLORIDA | 33444 | 561-743-0444 | | ACTIVE |
| INSURANCE 2 | ~~454-90-9999~~ | ~~APRIL 19, 1940~~ | ~~ROBERT~~ | ~~TOM~~ | ~~DOE~~ | ~~334 JOHN ROAD~~ | | ~~LINCOLN~~ | ~~NEBRASKA~~ | ~~44560~~ | ~~402-333-2323~~ | ~~ROB, BOB, ROBB~~ | ~~ACTIVE~~ |
| INSURANCE 3 | 505-78-6330 | JAN 8, 1958 | RIBERT | JOHN | DOE | 111 MEMORY LANE | | JUPITER | FLORIDA | 33444 | 561-743-0444 | R.WALKER | ACTIVE |
| INSURANCE 4 | 505-78-6330 | JAN 8, 1958 | BOB | WALKER | DOE | 111 MEMORY LANE | 322 | JUPITER | FLORIDA | 33444 | 561-743-0444 | BOB, ROB, ROBB | ACTIVE |
| INSURANCE 6 | ~~505-78-6330~~ | ~~MAR 13, 1944~~ | ~~JOHN~~ | ~~OWEN~~ | ~~THOMPSON~~ | ~~22 SOUTH STREET~~ | | ~~ST. LOUIS~~ | ~~MISSOURI~~ | ~~56223~~ | ~~306-256-5656~~ | ~~JONATHAN~~ | ~~ACTIVE~~ |
| INSURANCE 7 | ~~505-78-6330~~ | ~~APR 23, 1964~~ | ~~SUE~~ | ~~SALLY~~ | ~~DOE~~ | ~~111 MEMORY LANE~~ | ~~322~~ | ~~JUPITER~~ | ~~FLORIDA~~ | ~~33444~~ | ~~561-743-0444~~ | | ~~NOT ACTIVE~~ |
| CORRECTED | 505-78-6330 | JAN 8, 1958 | ROBERT | WALKER | DOE | 111 MEMORY LANE | 322 | JUPITER | FLORIDA | 33444 | 561-743-0444 | BOB, ROB, ROBB, WALKER | |

TO FIG. 16D2

FROM FIG. 16D1

PROVIDE INSURANCE INFORMATION TO CLIENT (I)

ALL RESPONSES THAT MATCH THE IDENTITY OF THE CONSUMER DATA ARE PROVIDED TO THE CLIENT

|  | SSN | DATE OF BIRTH | FIRST NAME | MIDDLE NAME | LAST NAME | ADDRESS 1 | APT | CITY | STATE | ZIP | PHONE | ALIAS | COVERAGE |
|---|---|---|---|---|---|---|---|---|---|---|---|---|---|
| INSURANCE 1 | 505-78-6300 | JAN 8, 1958 | BOB | WALKER | DOE | 111 MEMXRY LANE | 322 | JUPITER | FLORIDA | 33444 | 561-743-0444 |  | ACTIVE |
| INSURANCE 3 | 505-78-6330 | JAN 8, 1958 | RIBERT | JOHN | DOE | 111 MEMORY LANE |  | JUPITER | FLORIDA | 33444 | 561-743-0444 | R.WALKER | ACTIVE |
| INSURANCE 4 | 505-78-6330 | JAN 8, 1958 | BOB | WALKER | DOE | 111 MEMORY LANE | 322 | JUPITER | FLORIDA | 33444 | 561-743-0444 | BOB, ROB, ROBB | ACTIVE |

*FIG. 16D2*

METHOD AND SYSTEM FOR INFORMATION RETRIEVAL AND TRANSFER

CROSS REFERENCE TO RELATED APPLICATIONS

The present application is a Continuation in Part of application Ser. No. 09/751,815, now abandoned, which was filed on Dec. 29, 2000, and is hereby incorporated by reference in its entirety.

BACKGROUND OF THE INVENTION

1. Technical Field

This invention relates to the field of data retrieval and transfer, and more particularly, to the retrieval and transfer of demographic information and other information relating to an individual.

2. Description of the Related Art

When purchasing goods or services, consumers routinely provide information which can identify those consumers to the goods or service provider (merchant). For example, a consumer is typically asked to provide a merchant, such as a medical professional, with the following personal information: first name, middle name, last name, street address, city, state, zip code, telephone number, date of birth, email address, medical history, insurance information, and the like.

Conventional merchant data management systems typically require a consumer to manually fill out a questionnaire or a form to provide the aforementioned information. An employee of the merchant can then take the form from the consumer and manually enter the information into the merchant's system, whether that system is a paper based filing system such as an appointment book, or an electronic system implemented as a computer program. For example, if a consumer visits a physician or other medical service provider, the consumer likely will be required to fill out a form supplying the doctor with the consumer's relevant personal information and medical history. Having obtained the consumer's personal information, but before processing a transaction, the medical service provider typically will obtain that consumer's insurance information so that the bill for services rendered can be properly submitted to the insurer. Accordingly, the medical service provider must initiate a second process of verifying the consumer's insurance benefits through the consumer's insurance carrier.

Still, conventional systems for collecting consumer information, such as the systems mentioned above, can have disadvantages. For instance, manually and repetitiously providing consumer information on a paper form can become cumbersome for the consumer. Notably, even if a consumer has filled out a form for a particular merchant in the past, that merchant may periodically ask the patron to fill out another form to update the consumer's information within the merchant's system. Continuing with the previous example, a patient typically will visit a general medical practitioner before seeing a specialist. At the general practitioner's office, the patient will need to provide the general practitioner with various forms of personal, medical, and insurance information. Then, the general practitioner will need to obtain and verify the patient's insurance information with the patient's insurer. Upon being referred to and visiting a specialist, that patient again will have to provide the same information to the specialist. If that patient checks into a hospital on the advice of the specialist, the hospital, similar to the general practitioner, will need to obtain and verify the patient's insurance information with the patient's insurer. Still, if follow up treatment is necessary after a hospital visit, for example physical therapy, that therapist also will need to obtain and verify the patient's insurance information. Thus, for each doctor, specialist, or medical service provider to which a patient is referred, that patient must repetitiously provide the same personal, medical, and insurance information to the medical services provider. Adding to the redundancy, each medical service provider must not only obtain the patient's insurance information, but also verify that information with the patient's insurer.

Another disadvantage of conventional systems for collecting consumer information can be that the process of collecting, entering, and maintaining such information can become cumbersome for the merchant as well. While maintaining such consumer information can be beneficial to the merchant, maintaining accurate and timely records also places a burden on the merchant. For example, the merchant must devote resources to collecting, entering, and maintaining the consumer information. Another disadvantage of conventional methods of data management can be the risk of human error involved when the consumer fills out an information form, or when a merchant employee manually enters the consumer information into the merchant's system. Still, other human factors can lead to errors when consumer information is entered into a merchant system. For example, the illegible handwriting of a consumer can lead to an employee entering incorrect information into the merchant system.

SUMMARY OF THE INVENTION

The invention provides a method and system for collecting and transferring consumer information to a computer program in a user computer. Upon a user request for consumer information, the invention can retrieve that information from various locations within a computer communications network. Once retrieved, the consumer information can be transferred through the computer communications network to a computer program of the user's computer system. Specifically, the consumer information can be entered directly into a user interface, such as a character based user interface or a graphical user interface, of the computer program without the user having to manually type the information into the user interface. After the consumer information is transferred into the computer program, the user can process the information using any functionality provided by the computer program. For example, the consumer information can be used with regard to scheduling, billing, reporting, printing, or viewing.

One aspect of the invention can be a method for collecting and providing consumer information to a user. The method can include several steps such as authenticating a user to a service computer system and receiving from a requesting computer a request for consumer information from a user. Notably, the consumer information can include consumer demographic information, consumer insurance information, credit information, medical information, or public record information.

The request can identify a consumer. The step of retrieving the requested consumer information corresponding to the identified consumer from at least one network location can be included. The method further can include presenting the retrieved consumer information to the user for verification. The consumer information can include at least one data item. Also, the method can include the step of transferring at least one data item in the retrieved consumer information to a corresponding field in a user interface in the requesting computer. The transferring step can use screen scraping technology.

Another embodiment of the invention can be a method for collecting and providing consumer demographic information and consumer insurance information to a user. The method can include receiving from a requesting computer a request for consumer demographic information from a user. The request can identify a consumer. The step of retrieving the requested consumer demographic information corresponding to the identified consumer from at least one network location can be included. The consumer demographic information can include at least one data item. The steps of presenting the retrieved consumer demographic information to the user for verification and receiving from a requesting computer a request for consumer insurance information from a user can be included. Notably, the request can identify a consumer. The method further can include retrieving the requested consumer insurance information corresponding to the identified consumer from at least one network location. The consumer insurance information can include at least one data item. Upon verification of the consumer insurance information by the user, the step of transferring at least one data item in the retrieved consumer demographic information or the consumer insurance information to a corresponding field in a user interface in the requesting computer can be included.

Another aspect of the invention can be a system for collecting and providing consumer information to a user. The system can include a buffer for receiving a user request for consumer information from a requesting computer and for receiving the consumer information from a specified network location. Notably, the consumer information can include consumer demographic information, consumer insurance information, credit information, medical information, and public record information. The system further can include a consumer information matching system for retrieving the consumer information and a transfer agent for transferring at least one item of the consumer information in the retrieved consumer information to a corresponding field in a user interface in the requesting computer.

The consumer information matching system further can include a benefits matching system for retrieving and matching consumer insurance information and a demographic matching system for retrieving and matching consumer demographic information.

Another aspect of the invention can be a machine readable storage, having stored thereon a computer program having a plurality of code sections executable by a machine for causing the machine to perform a series of steps. The steps can include authenticating a user to a service computer system and receiving from a requesting computer a request for consumer information from the user. The request can identify a consumer. Notably, the consumer information can include consumer demographic information, consumer insurance information, credit information, medical information, or public record information. The machine readable storage further can cause the machine to perform the step of retrieving the requested consumer information corresponding to the identified consumer from at least one network location. The machine readable storage can cause the machine to perform the additional step of presenting the retrieved consumer information to the user for verification. The consumer information can include at least one data item. Also, the step of transferring at least one data item in the retrieved consumer information to a corresponding field in a user interface in the requesting computer can be included. The transferring step can use screen scraping technology.

Another embodiment of the invention can be a machine readable storage, having stored thereon a computer program having a plurality of code sections executable by a machine for causing the machine to perform a series of steps. The steps can include receiving from a requesting computer a request for consumer demographic information from a user. The request can identify a consumer. The step of retrieving the requested consumer demographic information corresponding to the identified consumer from at least one network location can be included. The consumer information can include at least one data item. Also, the step of presenting the retrieved consumer demographic information to the user for verification can be included. The machine readable storage further can cause the machine to perform the step of receiving from a requesting computer a request for consumer insurance information from a user. The request can identify a consumer. Additionally, the step of retrieving the requested consumer insurance information corresponding to the identified consumer from at least one network location can be included. The consumer information can include at least one data item. Upon verification of the consumer insurance information by the user, the step of transferring at least one data item in the retrieved consumer demographic information or the consumer insurance information to a corresponding field in a user interface in the requesting computer can be included.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 4 depicts an exemplary graphical user interface which can be used with the method and the system of the invention.

FIG. 6 depicts an exemplary graphical user interface which can be used with the method and the system of the invention.

FIGS. 9A and 9B depict exemplary graphical user interfaces which can be used with the method and the system of the invention.

FIG. 10 depicts an exemplary graphical user interface which can be used with the method and the system of the invention.

FIG. 12 depicts an exemplary graphical user interface which can be used with the method and the system of the invention.

FIGS. 13A, 13B, 13C, and 13D depict exemplary graphical user interfaces which can be used with the method and the system of the invention.

FIG. 14 depicts an exemplary graphical user interface which can be used with the method and the system of the invention.

FIGS. 15A and 15B depict exemplary insurance information for an individual.

FIGS. 16A-D depict a method for determining insurance coverage for a consumer according to another aspect of the invention.

DETAILED DESCRIPTION OF THE INVENTION

The invention provides a method and system for collecting and transferring consumer information, such as consumer demographic information and consumer insurance information, upon a user request. For example, the user requesting such information can be a provider of goods and services (merchant). Once collected, the consumer information can be transferred to the user. Specifically, the consumer information can be transferred into a computer program in a user computer. The consumer information can be entered directly into a user interface of the computer program without the user having to manually type the information into the user interface. Notably, the user interface can be any of a variety of user interfaces including, but not limited to, character based user interfaces or graphical user interfaces (GUIs). Once the consumer information is transferred to the computer program, the user can process the information using the computer program. For example, the consumer information can be processed with regard to scheduling, billing, reporting, printing, viewing, or any other function available in the computer program.

It should be appreciated that the invention can be used to collect any individual information, such as court records and filings, traffic records, real estate records, and credit information, other publicly available information, or information provided by a paid for service. Thus, the invention can be used with regard to any information accessible from a network location of a computer communications network, such as the Internet.

Figure 1:
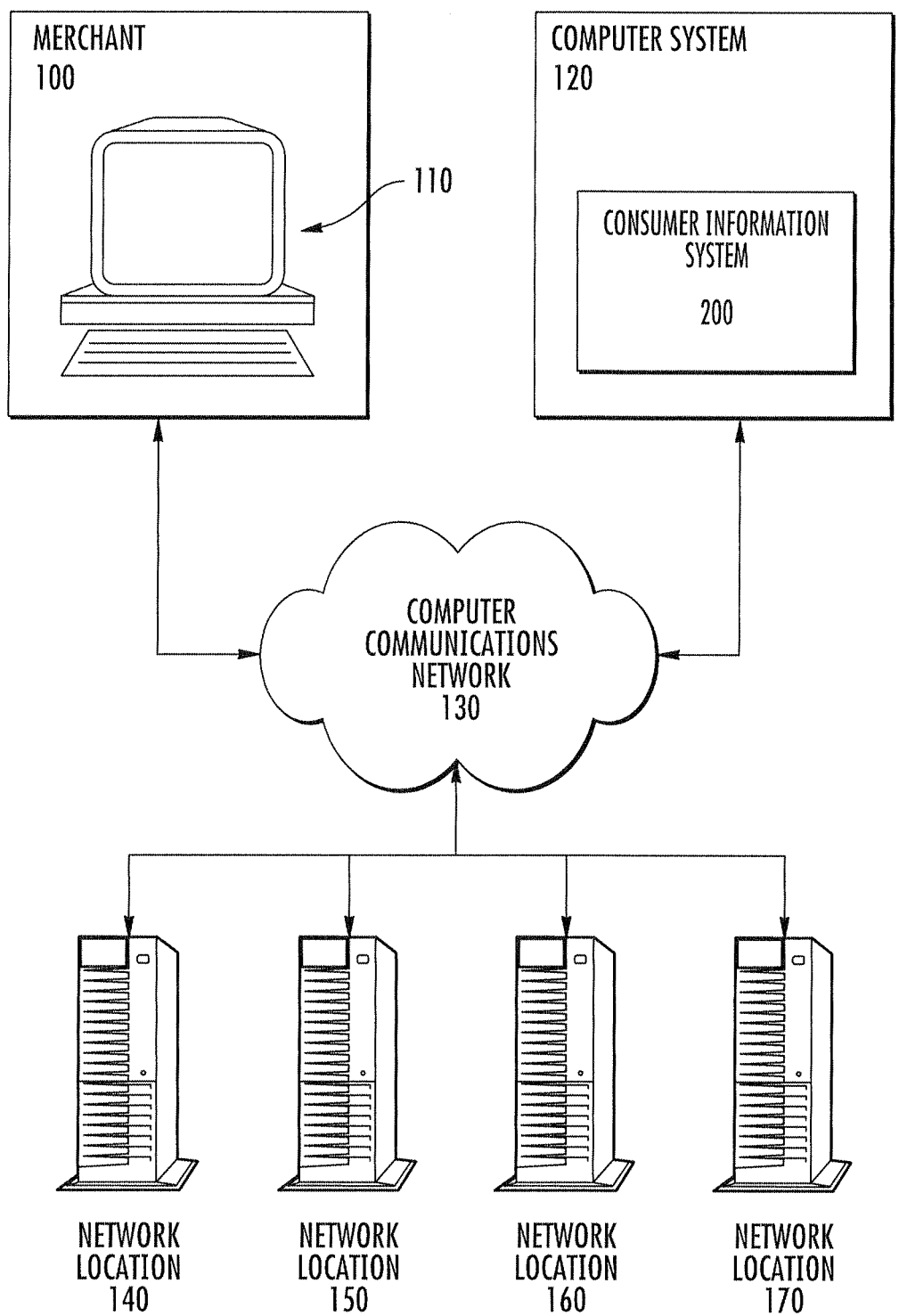
FIG. 1 is a schematic diagram of an exemplary network configuration capable of utilizing a method of the invention.

FIG. 1 is a schematic diagram depicting an exemplary computer communications network configuration suitable for use with the present invention. As shown in FIG. 1, the configuration can include a merchant 100, a merchant computer system 110, a computer system 120, a Consumer Information System (CIS) 200, a computer communications network 130, and one or more network locations 140, 150, 160, and 170. Merchant 100 can be any person or entity conducting business or otherwise performing a service in which the merchant 100 has a need for consumer information. For example, merchant 100 can be a medical practitioner or a group of medical practitioners forming a medical practice, a hospital, an internet site requiring data entry, a retail store, a telephone sales office, an insurance office, or the like.

The merchant computer system 110 can be a conventional computer system for use in conjunction with the present invention. Alternatively, the merchant computer system 110 can be a portable computer system such as a handheld computer or other personal digital assistant with information processing capability. The merchant computer system 110 can contain an operating system suitable for controlling the various hardware components of the merchant computer system 110 and for execution of various computer programs. Also included in merchant computer system 110 can be one or more computer programs which can be associated with the operation of the merchant's business. For example, the computer programs contained within the memory of the merchant computer system 110 can include, but are not limited to, scheduling, inventory, billing, or form generation programs. Notably, the aforementioned computer programs are for example only. Accordingly, the invention is not so limited by the particular type of computer program included in the merchant computer system 110.

Computer system 120 can be similar to the merchant computer system 110 as previously described, with the exception that computer system 120 can be an Internet Web server, for example the Apache Web Server. The computer system 120 can include the CIS 200 which can exist as one or more computer programs or plug-ins for use in the computer system 120. Functioning within computer system 120, the CIS 200 can receive merchant requests for consumer information. The merchant requests can be HTTP requests. Secured Socket Layer (SSL) protocol, HTTPS, or other security measures can be used to ensure secure exchange of information. Additionally, the CIS 200 can receive requests using Electronic Data Interchange (EDI), a standard format for exchanging data well known in the art. Responsive to those requests, the CIS 200 further can initiate and transmit requests for consumer information to one or more network locations. Similar to the merchant request, the CIS 200 can transmit requests using HTTP or EDI. Notably, SSL, HTTPS, or other security measures also can be used. The CIS 200 can receive the requested consumer information from the network locations, store consumer information, and transfer the received consumer information to the merchant computer system 110.

In requesting information from network locations, receiving that information, and displaying the information to the merchant, the CIS 200 can utilize screen scraping technology. Screen scraping technology can be programming that translates between legacy computer programs and newer user interfaces so that the logic and data associated with the legacy programs can continue to be used. Additionally, screen scraping can include optical character recognition to convert graphically formatted data or graphics to data. For example, screen scraping technology can be used to convert a picture of a document, or an HTML document to usable text data. Data received from the legacy program can be reformatted for the screen of a different user interface such as a character based user interface or a graphical user interface including a Web browser. Additionally, user input from newer user interfaces, such as a graphical user interface or a Web browser, can be reformatted so that the request can be handled by the legacy computer program as if it came from a user of the older device and user interface.

Network locations 140 through 170 can include Internet Web servers hosting Web-based documents. Network locations 140 through 170 also can include databases which can contain consumer information, for example the consumer information requested by the CIS 200.

Communication between the various computer systems of FIG. 1 can be facilitated through the computer communications network 130, which can be any suitable computer communication network. For example, the computer communications network 130 can be the Internet where communication can be facilitated through TCP/IP, HTTP, and FTP protocols, each well known in the art. Alternatively, communication can be facilitated through direct network access, an Integrated Service Digital Network (ISDN) connection, or a series of direct dial up connections initiated by the merchant computer system 110 and the computer system 120. Notably, any suitable method of connecting computers in a computer communications network can be used.

The CIS 200 can include one or more computer programs which can receive and process user requests for consumer information. The CIS 200 can collect the requested consumer information and transfer that information directly in a field of a user interface of the user's computer program.

Figure 2:
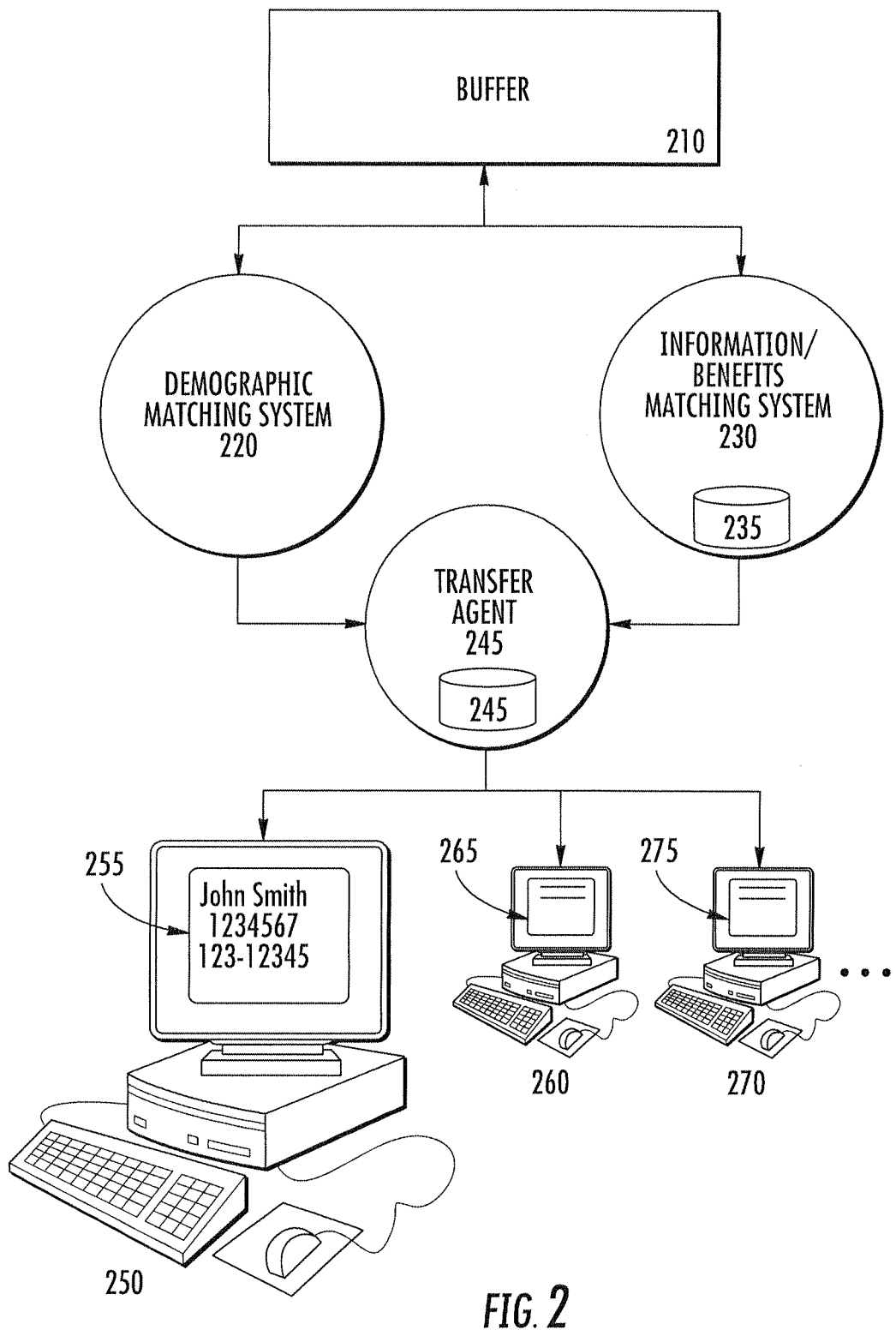
FIG. 2 is a schematic diagram illustrating an exemplary system of the invention.

A CIS 200 in accordance with the inventive arrangements is shown in FIG. 2. The CIS 200 can include a buffer 210, a Demographic Matching System (DMS) 220, a Information Matching System (IMS) 230, and a transfer agent 240. Each of these components can be included in the computer system 120. The buffer 210 can receive and store merchant requests for information. In addition, the buffer 210 can receive and store search request results and any other information necessary for providing the requested consumer information to a merchant.

The DMS 220 can receive a merchant request for demographic information from buffer 210 and process the received request. Notably, demographic information can include, but is not limited to, a consumer's first name, middle name, last name, multiple addresses such as a home and a work address including the city, state, and zip code, as well as telephone numbers, date of birth, email addresses, and other general information. Upon receiving a merchant request for consumer demographic information, the DMS 220 can identify the consumer for whom the merchant has requested demographic information using an identifier corresponding to that consumer. Notably, the identifier can be a unique identifier such as a social security number.

Having identified the consumer, the DMS 220 can initiate one or more requests for that consumer's demographic information from various sources of demographic information. For example, the DMS 220 can access one or more network locations or Web sites such as <www.edatasolutions.com> which provides consumer demographic information via a computer communications network. Other examples can include submitting an HTTP request to a publicly accessible and searchable Web site. The DMS 220 can receive the requested consumer demographic information and match that information to the consumer identified within the merchant request.

The IMS 230 further can operate on a merchant request for consumer information. Similar to the DMS 220, the IMS 230 can identify the consumer for whom the merchant has requested additional information using the identifier corresponding to that consumer included in the merchant request. Notably, whereas the DMS 220 can obtain consumer demographic information, the IMS 230 can obtain any of a variety of additional information relating to the identified consumer. For example, the IMS 230 can request information including, but not limited to, insurance information, court records and filings, traffic records, real estate records, credit information, other publicly available information, or information provided by a paid for service. In the case where the IMS 230 retrieves insurance information, the IMS can be referred to as a Benefits Matching System. Insurance information can include, but is not limited to, the patient's insurer, group number, identification number, the specific policy parameters such as co-pay amounts for various services as well as the percentage of expenses for such services covered by the medical insurer. Thus, the IMS 230 allows a merchant to verify a consumer's eligibility and the specific benefits provided by the consumer's insurer. The IMS 230 also can receive the aforementioned information in response to initiating a request for such information. Once collected, the IMS 230 can match the received additional information to any previously received demographic information retrieved by the DMS 220. For example, the IMS 230 can match received additional information such as insurance information to previously received consumer demographic information using the consumer identifier. Further, in cases where the IMS 230 requests several different types of consumer information, the IMS 230 can match each type of received consumer information to previously received consumer information using the user identifier.

In an embodiment where the IMS 230 retrieves consumer insurance information, the IMS 230 can contain a consumer information data structure 235. The consumer information data structure 235 can include a listing of consumers and corresponding insurance carriers which have been identified as providing benefits to those corresponding consumers. Notably, this information can be obtained through data mining techniques, directly from insurance carriers, or alternatively, can be provided by consumers. For example, upon receiving a request for consumer insurance information, the IMS 230 can match the received consumer identifier to the associated consumer in the consumer information data structure 235. The IMS 230 also can determine one or more insurers associated with the consumer identifier from the consumer information data structure 235. Thus, the insurance carriers associated with the particular consumer identifier can be identified as providing insurance benefits to the consumer identified by the consumer identifier. Accordingly, those insurance carriers can be queried for insurance information pertaining to the consumer identified by the consumer identifier specified by the merchant.

In another embodiment, the IMS 230 can retrieve so called "Doctor's Savings Plan" information and consumer credit information. For example, consumer credit information can be retrieved with Doctor's Savings Plan information where a patient has joined such a plan rather than carrying insurance. Under a Doctor's Saving Plan, the patient pays for services rendered rather than an insurance carrier. Though the patient pays for services, by joining the plan the patient gets the benefit of a favorable fee arrangement with the doctor. In particular, doctors, or their intermediaries, can agree to charge reduced rates for members of the plan. The rates can be similar or equal to the fees agreed upon between the doctor or doctor groups and an insurance carrier. Because the patient must pay any amount billed without the aid of insurance, the IMS 230 can retrieve the patient's credit information for the medical service provider to verify that the consumer has the means necessary to pay for services rendered. Thus, the IMS 230 can retrieve the patient's credit information and plan information, including fee arrangement information, membership details, and verification from the plan.

In another embodiment, the IMS 230 can retrieve auto insurance information from insurance carriers. In that case, the IMS 230 can retrieve policy details such as coverage limits, deductibles, as well as verification that a consumer is insured. For example, automobile repair shops can verify that a patron is covered by automobile insurance before proceeding to work on an automobile. It should be appreciated that nearly any merchant who can receive payment from an insurance carrier can use the system to retrieve consumer insurance information from an insurer. Another example can include a general contractor retrieving consumer insurance information pertaining to a consumer's home insurance prior to working on a home.

The transfer agent 240 can organize the retrieved consumer information, which can include consumer demographic information and any of the additional information types previously described and received by the CIS, according to merchant preferences. Further, the transfer agent can format the retrieved consumer information using a suitable markup language such as HTML or XML so the merchant can view the information as a markup language document via the network connection prior to transferring the information to the merchant's computer program. After organizing the retrieved consumer information, the consumer information can be transferred directly to one or more computer programs in a merchant computer system such as merchant computer systems 250, 260, and 270 shown in FIG. 2. In one embodiment, the transfer agent 240 can contain data structures 245 for associating merchants having access to the CIS with one or more computer programs. Each data structure 245 further can indicate the type of consumer information and formatting of that information used by the various computer programs stored within the data structure. Thus, during a registration process where a merchant can obtain a merchant identifier and a password or other access code for accessing the CIS, the merchant can inform the CIS of which computer programs the merchant uses. Notably, the data structure 235 also can store a merchant identifier and the merchant access code. In another embodiment, the merchant can specify which computer program consumer information is to be transferred before initiating the transfer. In that case, the merchant can be presented a list of available selections from which to choose.

In operation, the transfer agent 240 can transfer consumer information directly into a user interface of the computer program such that the data fields of the user interface can be automatically filled in with the appropriate consumer information. For example, the transfer agent 240 can insert the consumer's first name into the first name field of the computer program user interface. Similarly, the transfer agent 240 can continue to place any retrieved information into the appropriate data fields of the computer user interface.

The transfer agent 240 can utilize screen scraping technology to extract information from the markup language document presented to the merchant. After extracting items of consumer information, the items of the consumer information can be transferred to the merchant computer system. Alternatively, the transfer agent can parse items of consumer information from the markup language itself. For example, the transfer agent 240 can remove the formatting tags or search for particular tags of the markup language to extract information that follows. Notably, the transfer agent can use one or more templates stored the data structure 245 to locate data items within the markup language document. In another embodiment, the transfer agent 240, already can be in receipt of consumer information without markup language formatting. In that case the received consumer information can be transferred directly to the merchant computer program without the need for parsing of markup language or screen scraping. Further, the types of items of consumer information, such as first name, last name, phone number, insurance carrier, and group number, for example, can be identified by the placement of that information within the information received from the network location. Accordingly, after formatting that information using a markup language, the transfer agent 240, after any subsequent screen scraping of that markup language document or parsing of markup language, can identify information item types by placement of those items within the markup language document.

The transfer agent 240 can access the data structure 245 to determine the particular computer program used by a merchant. Accordingly, the data structure 245 can indicate the format of the user interfaces used by that computer program. For example, in the case of a Windows computer program, the data structure 245 can contain the field identifiers of the merchant's computer program user interface to identify the user interface fields where consumer information can be transferred. Alternatively, if the merchant computer program incorporates Microsoft® Active Accessibility®, then the transfer agent 240 can identify fields of the merchant's computer program user interface using that technology. For non-Windows computer programs, the data structure 245 can contain one or more coordinates specifying the location of the user interface fields of the merchant computer program. For example, in the case of character based user interfaces, the coordinates can be specified as a column and character locations. In the case of other graphical user interfaces, the unit of measure can be pixels.

FIG. 2 depicts the example where the patient name "John Smith" has been transferred into the appropriate field of one or more exemplary user interfaces 255, 265, and 275 on a merchant computer system. Also transferred has been the group number corresponding to John Smith. Thus, the consumer information can be transferred to the computer program, and specifically the data fields of the computer program user interface, without the merchant having to manually type any information. As mentioned, the data structure can indicate the specific computer programs used by a merchant, as well as the information and information formatting requirements of those computer programs. Using the data structure, the transfer agent 240 can transfer retrieved consumer information directly into any known computer programs.

It should be appreciated that although the DMS 220, the IMS 230, and the transfer agent 240 are depicted in FIG. 2 as separate computer programs, the programs can be implemented as a single more complex computer program. Additionally, the programs can exist in varying combinations. For example, DMS 220 can be combined with IMS 230, IMS 230 can be combined with transfer agent 240, or any other combination thereof. Alternatively, the components of CIS 200 can be distributed among one or more different computer systems within a computer communications network.

Figure 3:
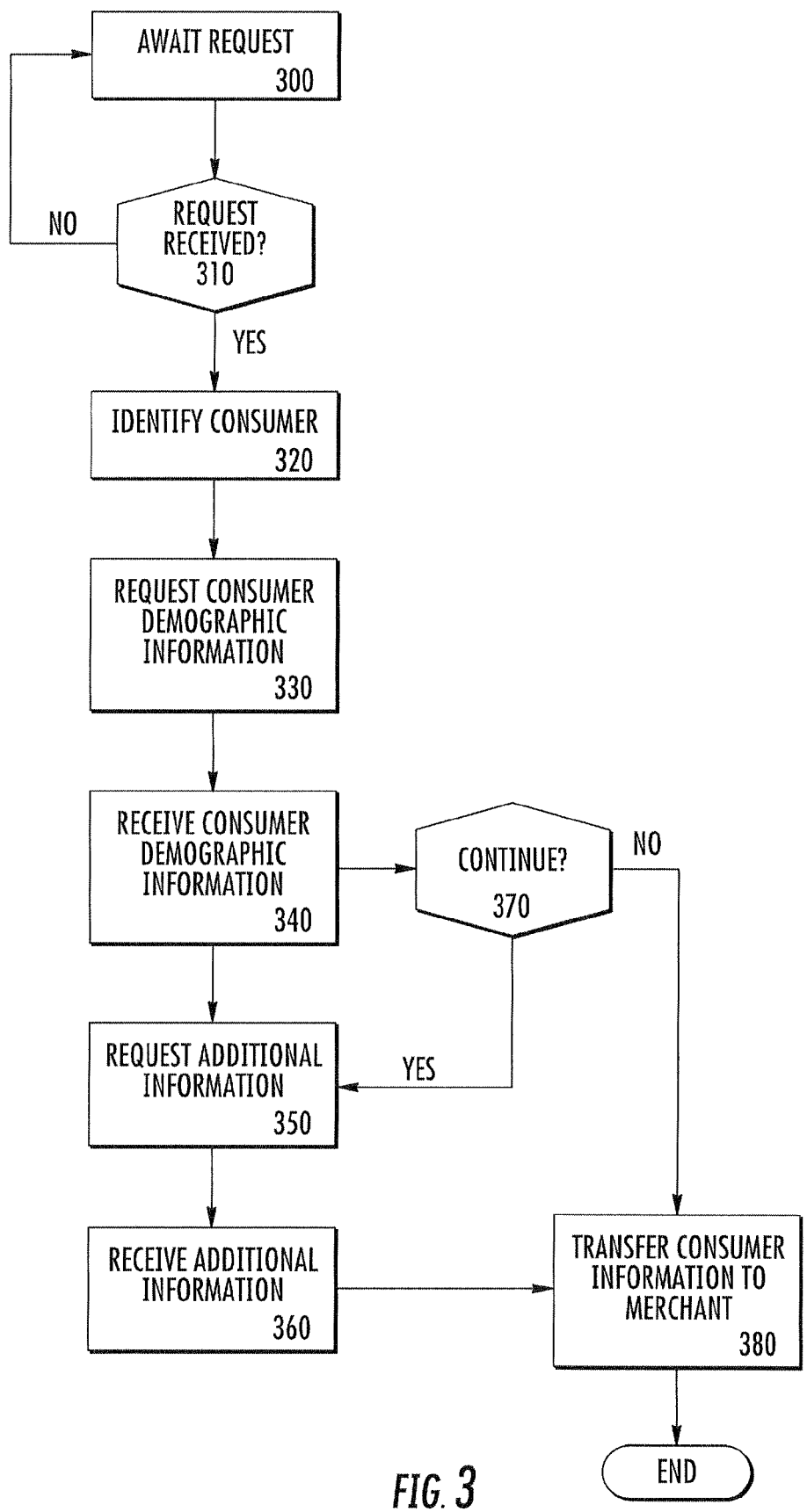
FIG. 3 is a flow chart illustrating an exemplary method of the invention.

FIG. 3 is a flow chart for illustrating a process of collecting consumer information as performed by CIS 200 of FIG. 2. The method of the invention begins at step 300 where the CIS can be in a normal operating mode awaiting a request to retrieve consumer information. Accordingly, at the outset of the process of FIG. 3, it is presumed that the merchant has already established a communications session with the CIS. Further, it is presumed that the merchant has been successfully authenticated or logged on to the CIS using any of a variety of appropriate security protocols. For example, the merchant can establish a dial-up communications session or visit the CIS as implemented using a Web site as an interface. Regardless, the merchant can provide a merchant identifier and a password to the CIS in order for the CIS to authenticate the merchant. Notably, such login procedures and security protocols are well known in the art.

As mentioned, the CIS can contain a data structure associating each merchant having access to the CIS with the particular computer programs used on that merchant's computer system. Thus, once authenticated to the CIS, the CIS can identify each computer program being used by that particular merchant from the data structure. Accordingly, the CIS can be programmed to work with any of a variety of computer programs for processing consumer information. Once the merchant has been authenticated and the CIS has identified the computer programs being used by the merchant, the CIS can continually loop between steps 300 and 310 until the CIS receives a request for consumer information from the merchant. Thus, if a request for consumer information is received, the CIS can proceed to step 320.

In step 320 the CIS can receive a merchant request for consumer information. As mentioned, the request can be received via a computer communications network such as the Internet. Within the request, the merchant can specify a consumer identifier which can correspond to a consumer for whom the merchant is requesting consumer information. For example, the consumer identifier can be a social security number, a telephone number, or any other identifier which can identify that consumer. The consumer identifier can be a unique identifier, but need not uniquely identify the consumer because of the verification functionality included in the invention. Upon receiving the merchant request for consumer information, the CIS can identify the consumer using the consumer identifier within the merchant request. For example, a medical practitioner can enter a patient's social security number in a user interface on a Web site implementation of the CIS and activate a control to initiate a request for that patient's demographic and insurance information.

It should be appreciated, however, that the acquisition of some types of sensitive information can require a unique, secure identifier, such as a social security number, for processing. Accordingly, to access such sensitive information, the consumer social security number, rather than other user identifiers, can be required. After completion of step 320, the CIS can proceed to step 330.

In step 330 the CIS can incorporate the consumer identifier within a request for consumer demographic information and can transmit that request over the computer communications network. As mentioned, this request can be directed to one or more information suppliers, such as Web sites or other network locations connected to the Internet which provide consumer demographic information. For example, the CIS can request the demographic information from one or more sources for the patient identified using the social security number provided by the medical practitioner. After completing step 330, the CIS can continue with step 340.

In step 340 the CIS can receive the requested consumer demographic information from the information suppliers. The received consumer demographic information can be displayed to the merchant so that the merchant can verify that the consumer demographic information being displayed is correct. Additionally, if more than one set of consumer demographic information is retrieved, the merchant can select the desired set of consumer demographic information. For example, if a telephone number is used as a consumer identifier, the CIS can retrieve consumer information for any consumers having that telephone number. Specifically, the CIS can retrieve the consumer information for each member of a family if those family members share the common telephone number specified as the consumer identifier. Another exemplary situation where multiple sets of consumer data can be retrieved is where a consumer identifier such as a social security number corresponds to a single individual having multiple address listings. This can be the case where the consumer has recently moved and that consumer's information has not yet been fully updated. Regardless of how multiple information sets can be retrieved, the CIS can provide the merchant an opportunity to select the desired set of consumer information. For example, any retrieved information can be formatted using an appropriate markup language such that a merchant can view and verify the retrieved information in a Web site implementation of the invention. Notably, the retrieved information can be presented to the merchant for verification whether or not multiple sets of information have been retrieved. If the merchant does not require any further consumer information, the CIS can proceed to step 370 after completion of step 340.

In step 370, if the merchant requires or requests further consumer information, then the CIS can continue to step 350. If not, the CIS can continue to step 380. Notably, the initial merchant request can specify the type of consumer information to be retrieved by the CIS. For example, the initial request of step 310 can specify that the merchant desires consumer demographic information as well as consumer insurance information. In that case, the CIS can initiate multiple requests for different types of consumer information. This information can be displayed to the merchant for verification. Alternatively, the merchant can request one type of consumer information independently of any other information. For example, the merchant can request consumer insurance information without requesting consumer demographic information. Similarly, the merchant can request consumer credit information without requesting consumer demographic information. Thus, although consumer demographic data was used as an example in the previous steps, a merchant can request any of the information types previously mentioned, without having to obtain the information in any particular order.

Still another embodiment can be a step by step process where the user is user guided through multiple steps of requesting information using multiple user interfaces. In this embodiment, for example, the programming of the CIS can be tailored for particular business computer programs. Thus, for medical service providers, the CIS can be implemented so that the merchant first obtains consumer demographic information, and then the merchant obtains consumer insurance information. For retailers, the CIS can be implemented to first obtain consumer demographic information and then obtain consumer credit information. In this manner, the merchant can interact with a user interface to obtain and verify one type of consumer information before obtaining and verifying a second or third type of consumer information.

It should be appreciated that in each of the implementations discussed, if multiple sets of consumer information have been retrieved by the CIS, the merchant can be presented with the multiple sets of information. The merchant can then select the desired set of consumer information, whether that information type be demographic, credit, public records, etc. Regardless of how additional consumer information is requested, if such information is requested, then the CIS can proceed to step 350.

In step 350 the CIS can request additional information concerning the identified consumer. This additional information can be insurance information including the consumer's insurance carrier, carrier information, and other policy details. Other types of additional consumer information can include, but are not limited to, court records, traffic violations, arrest records, real estate records, public filings, and credit information. Similar to requesting consumer demographic information, the CIS can initiate a request using the consumer identifier over the computer communications network for this additional information. Notably, the CIS can initiate one or more requests for data from various sources. For example, regarding public filings, the CIS can request such information from one or more on-line sources of public information such as Web sites, whether operated by a commercial entity or a governmental entity. Another example can be requesting consumer insurance information corresponding to the consumer using the consumer identifier from one or more insurance carriers. After completion of step 350, the system can continue to step 360.

In step 360, the CIS can receive the requested information. Notably, the CIS can receive the aforementioned additional consumer information from one or more sources. Similar to step 340, if the CIS retrieves more than one set of consumer information of a particular information type, each corresponding to the merchant specified consumer identifier, the retrieved sets of consumer information can be presented to the merchant. The merchant can then select the desired set or sets of consumer information. Notably, the CIS can include logic for selecting the correct set of consumer information based on previous merchant selections. For example, if two sets of consumer credit information are retrieved, the CIS can determine the set of consumer credit information most likely to be correct based on a previously obtained and selected set of consumer information. Thus, the CIS can display the favored set of consumer credit information as the first selection within a list of information sets presented to the merchant. In any case, the CIS can present the retrieved additional consumer information to the merchant for verification. For example, the CIS can format the retrieved information using a suitable markup language for displaying the information to the merchant on a Web site implementation of the invention. After completion of step 360, the CIS can proceed to step 380.

In step 380 the CIS can transfer any retrieved and selected consumer information to the merchant computer system. Specifically, the CIS can transfer any retrieved information into a user interface display of a computer program on the merchant's computer system. In transferring the consumer information, the CIS can identify particular items of the consumer information according to item types such as first name, middle name, last name, insurance carrier, etc. By identifying the item types included within the retrieved consumer information, the transfer agent can place the appropriate data types into the appropriate fields of the computer program user interface of the merchant computer system. For example, the item of the consumer information identified as the first name can be entered into a field of the computer program user interface for the consumer's first name. The procedure can be repeated for each item type within the consumer information, i.e., last name, insurance carrier name, co-pay, type of insurance coverage, etc., so long as the computer program can accept or store that item type. It should be appreciated that because the CIS 200 retrieves consumer information from known sources, the CIS 200 can be programmed, for example using a look-up table or a table of templates, with the placement of particular items of consumer information such as first name, last name, or insurer name within received consumer information. In this manner, the CIS 200 can identify particular items of consumer information received from the various network locations.

Once transferred in this manner, the consumer information need not be manually entered by an employee of the merchant or written down by the actual consumer when visiting the merchant. Further, the information can be processed and edited within the computer program in accordance with any functionality provided by the computer program. For example, upon the user making an appointment with a medical practitioner, the consumer information can be collected using the system of the invention. Thus, when the consumer, in this case a patient, enters the doctor's office, the medical practitioner's computer program already contains the patient's demographic and insurance information. As a result, the patient need not fill out any forms. Rather the medical practitioner can print a form already containing the patient's consumer information.

Figure 4:
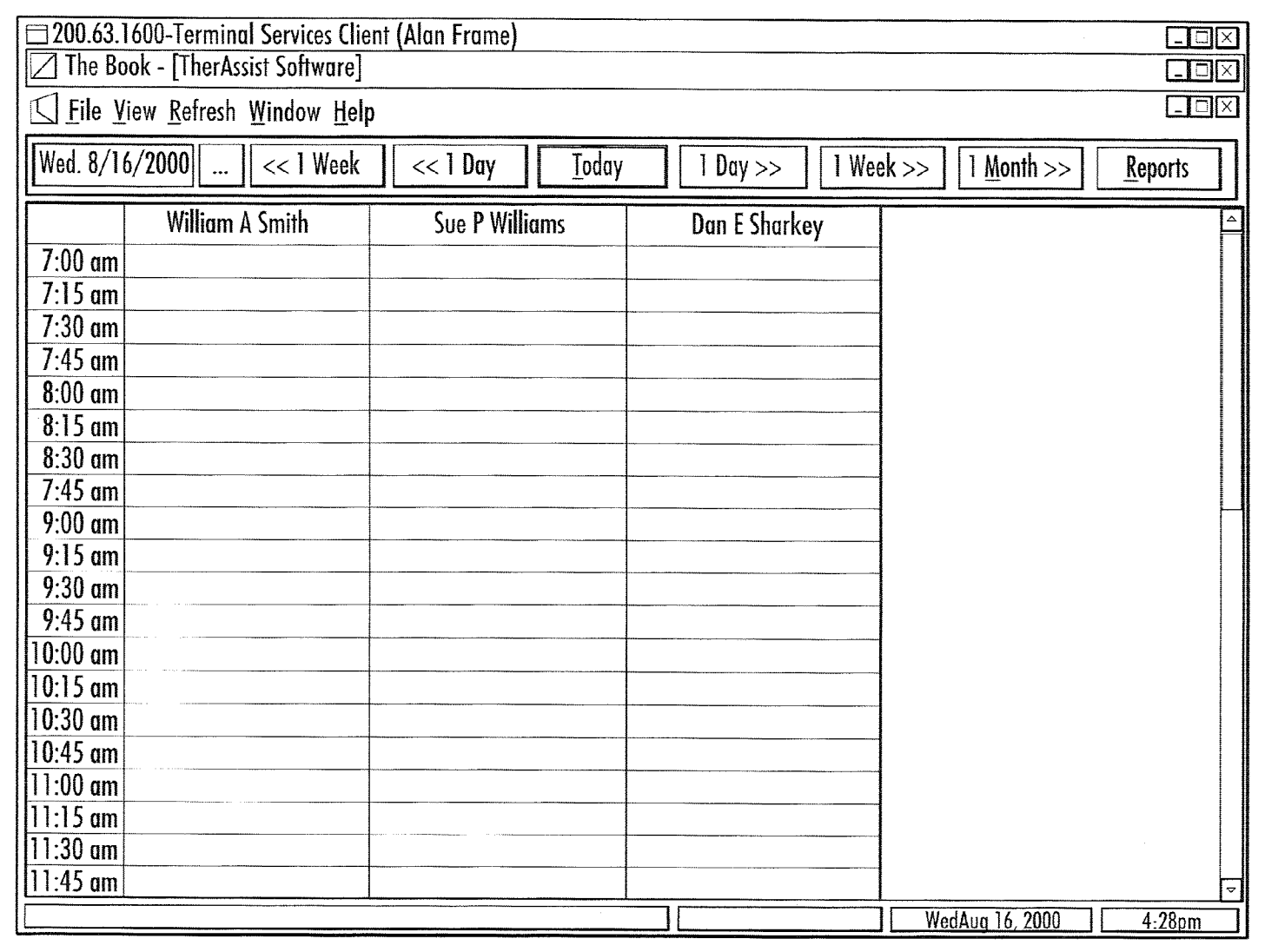

FIG. 4 depicts an exemplary user interface which can be used with the present invention. The exemplary user interface can be utilized with a scheduling program. For example, a user such as a medical practitioner can select a time block 400 within the user interface to schedule an appointment or other office visit.

Figure 5:
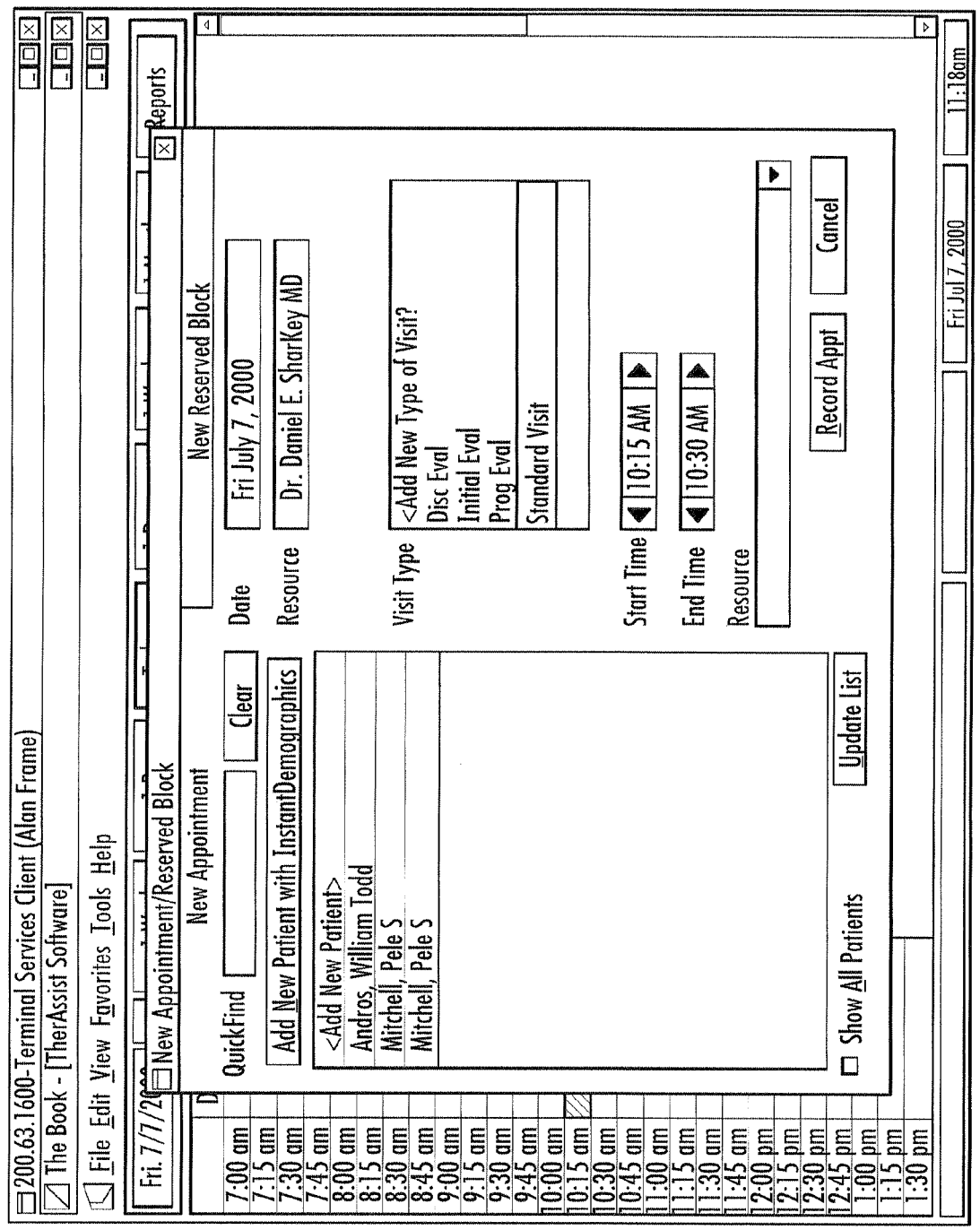
FIG. 5 depicts an exemplary graphical user interface which can be used with the method and the system of the invention.

FIG. 5 depicts an exemplary user interface which can be presented responsive to selection of the time block 400 in FIG. 4. For example, the exemplary user interface of FIG. 5 allows a user to select a consumer name from list 410, in this case a patient, and further specify the type of appointment or service from list 420 to be provided during the patient's visit to the medical practitioner. An activatable icon 430 also can be provided for initiating a request to obtain consumer information.

FIG. 6 depicts an exemplary user interface which can be presented to a merchant so that the merchant can log in to the CIS. For example, the user interface of FIG. 6 can be presented to a user after a communication session is initiated between the merchant computer system and the CIS. The exemplary user interface can include a field 432 for receiving a merchant username and a field 434 for receiving a merchant password. Additionally, navigational controls can be provided such as activatable icon 436.

Figure 7A:
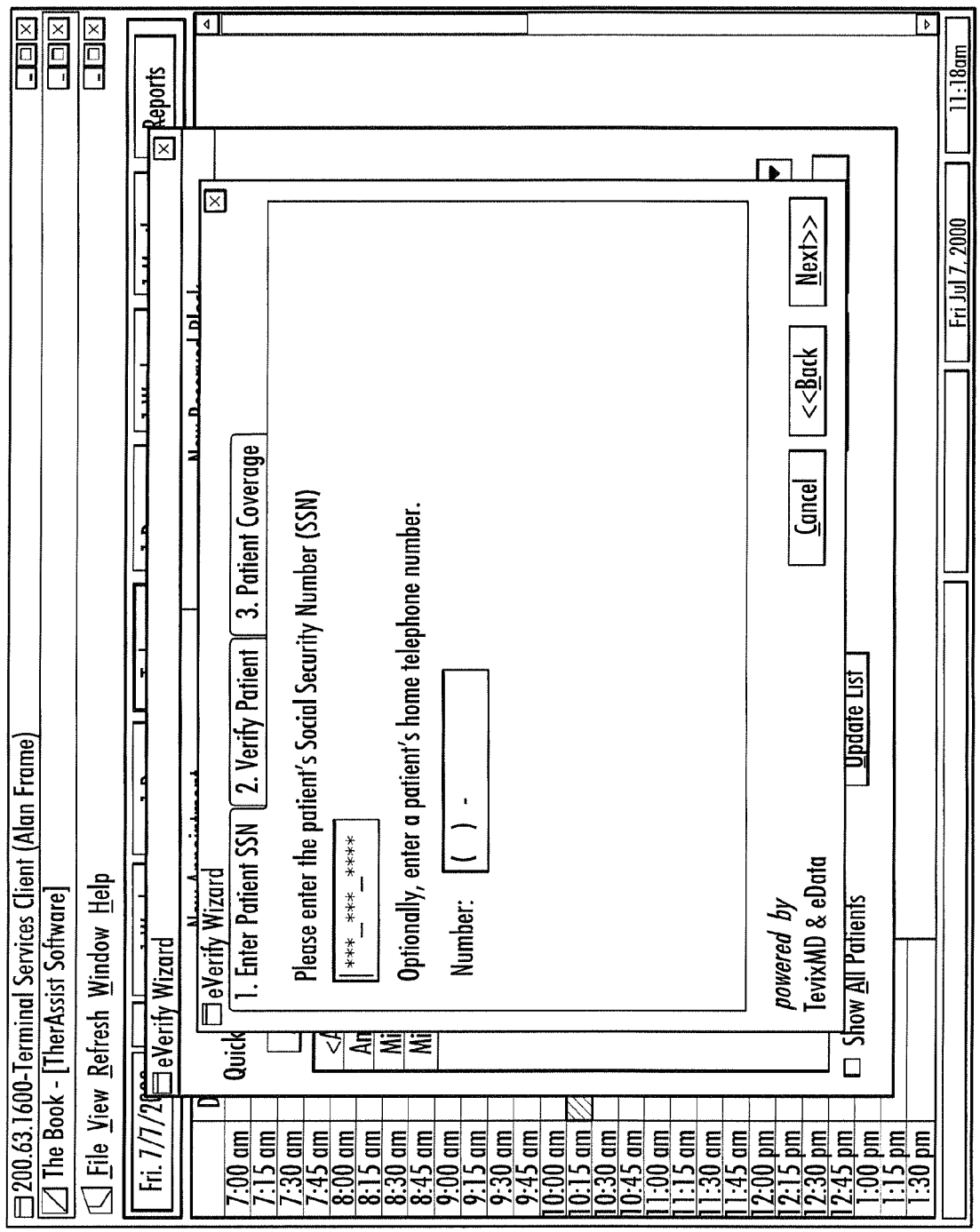
FIGS. 7A and 7B depict exemplary graphical user interfaces which can be used with the method and the system of the invention.

FIG. 7A depicts an exemplary user interface which can be presented to a user after that user successfully logs in to the present invention. For example, the user interface can be presented in the case of an Internet Web site implementation of the present invention. In any case, the exemplary user interface includes one or more fields for receiving an identifier corresponding to a consumer or patient for whom information is to be requested. For example, field 440 can be included for receiving a patient social security number. Additionally, field 450 can be included for receiving a patient's telephone number. Additional activatable icons can be provided for navigating to the next exemplary user interface or to a previous exemplary user interface. For example, activatable icon 460 can cancel the process of requesting patient information. Activatable icon 470 can cause a previous exemplary user interface to be presented to the user. Activatable icon 480 can cause a next exemplary user interface to be presented to the user.

Figure 7B:

FIG. 7B depicts another exemplary user interface. Field 510 can be included for receiving a consumer identifier. Responsive to activating the activatable icon 515, consumer demographic information can be retrieved and displayed in fields 520.

Figure 8:
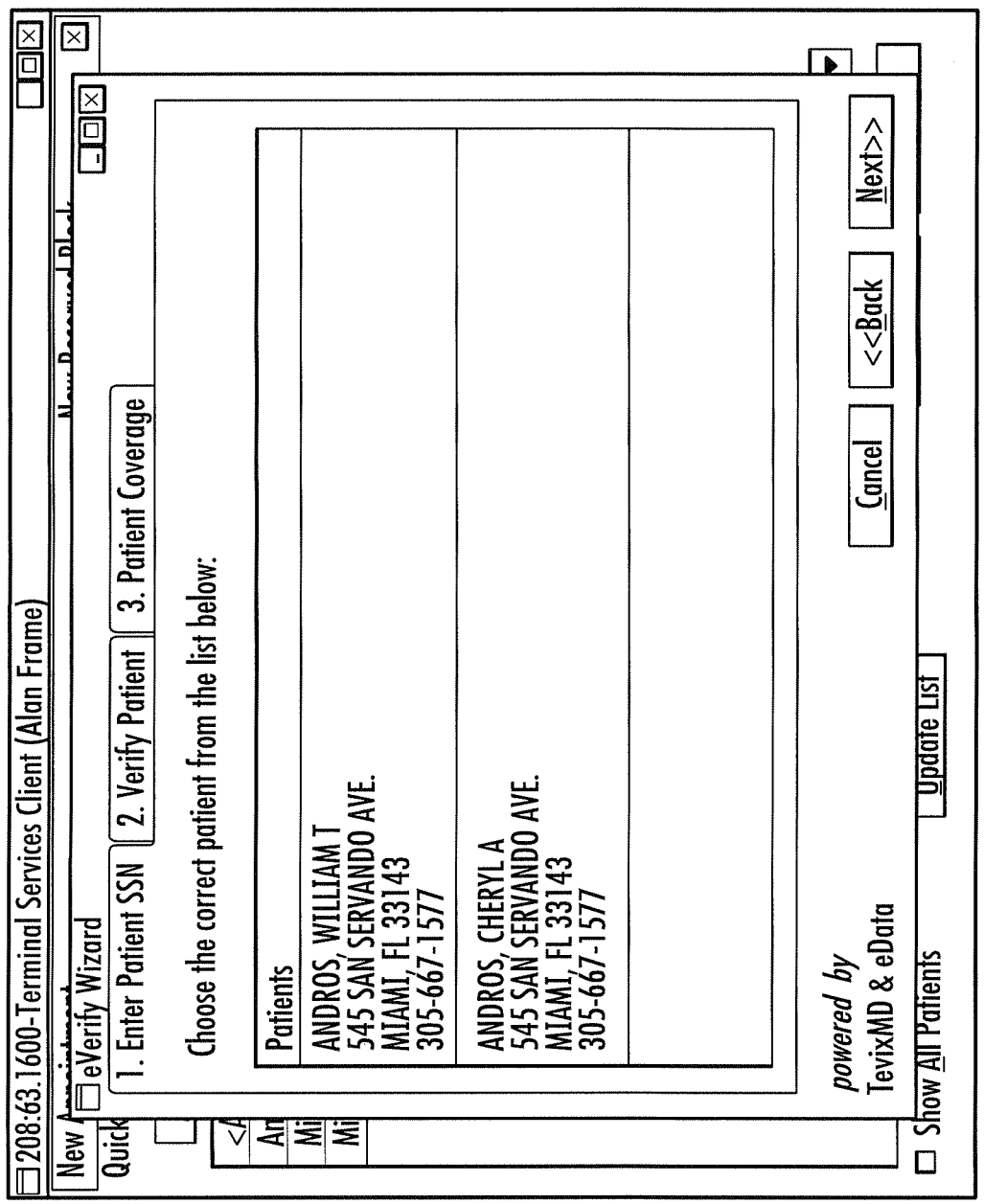
FIG. 8 depicts an exemplary graphical user interface which can be used with the method and the system of the invention.

FIG. 8 depicts an exemplary user interface which can be used to present retrieved consumer demographic information to the user. For example, the two sets of demographic information shown in field 490 can correspond to the identifier entered by a user in the exemplary user interface of FIG. 7A or 7B. Notably, the two sets of demographic data retrieved by the system can be displayed so that the user can select the correct or desired set of demographic data. Further, navigational controls can be provided as previously described and can be included for returning to a previous user interface or proceeding to a next user interface. For example, if the user entered an incorrect consumer identifier, then the user can select the "BACK" activatable icon. Thus, the previous exemplary user interface of FIG. 7A or 7B can be displayed so that the user can enter the correct user identifier. It should be appreciated that the various controls for navigation and selection of items can be included within each exemplary user interface disclosed herein.

Figure 9A:
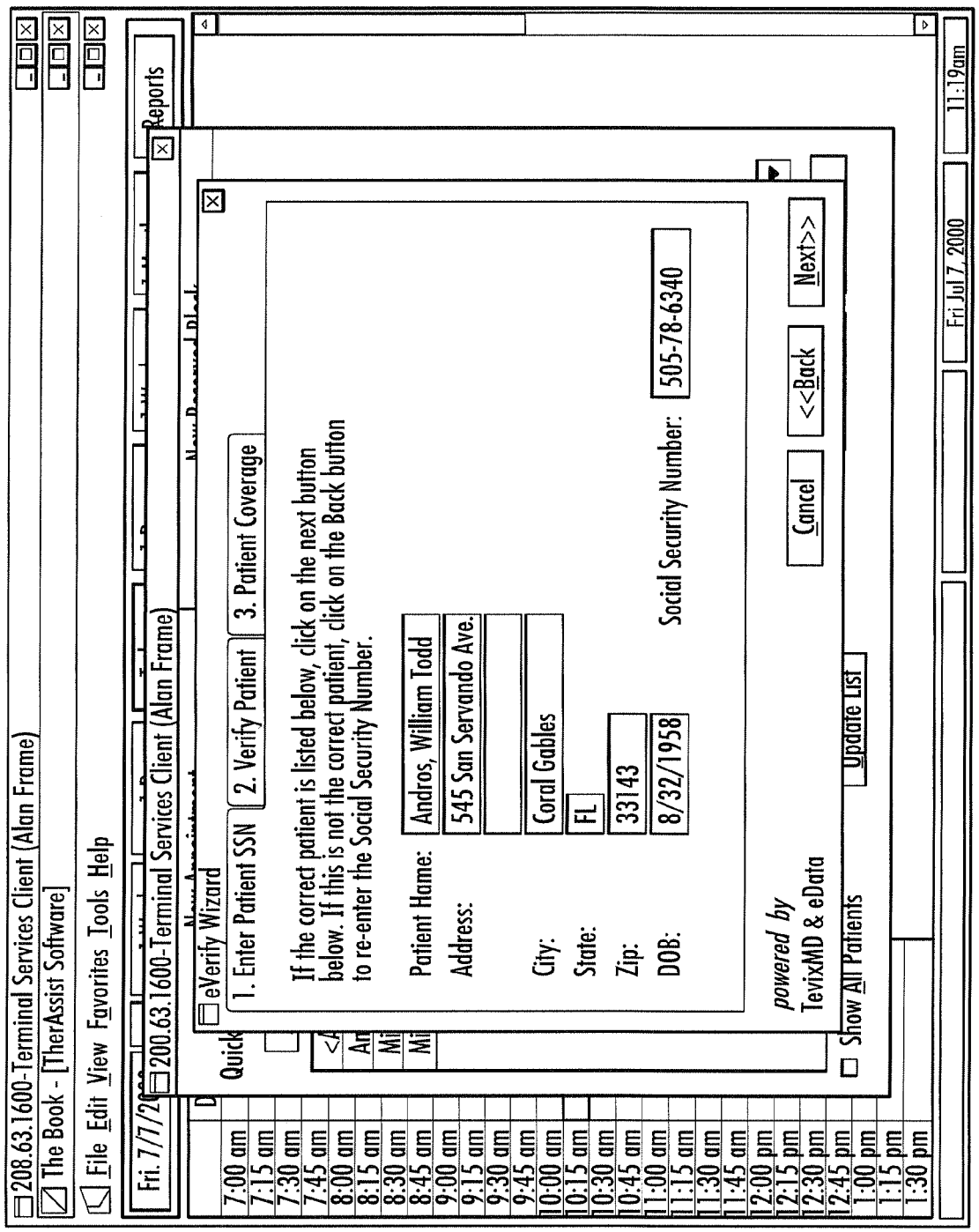

FIGS. 9A and 9B depict exemplary user interfaces which can display a user selected set of demographic information to the user for verification. For example, the user can select a set of information from field 490 of FIG. 8. Thus, when the user proceeds and one of the exemplary user interfaces of FIG. 9A or 9B is displayed, the user can verify that the information presented is correct. Notably, the user need not select a set of consumer information as described in FIG. 8. Rather, the user can scroll through the data sets which can be displayed in a serial fashion using the exemplary user interfaces of FIG. 9A or 9B.

FIG. 9A can include fields 530 for displaying consumer demographic information. FIG. 9B can include field 540 for receiving and displaying a consumer identifier. User activatable icon 560 further can be included for initiating the retrieval of consumer demographic information. Once retrieved, the consumer demographic information can be presented in fields 550.

FIG. 10 depicts an exemplary user interface for retrieving consumer insurance information or other additional consumer information after retrieval of consumer demographic information. Field 570 can be included for receiving a consumer identifier. User activatable icon 590 also can be included for initiating the retrieval of additional consumer information. Fields 580 can be included for displaying consumer demographic information to a merchant or user.

Figure 11:
FIG. 11 depicts an exemplary graphical user interface which can be used with the method and the system of the invention.

FIG. 11 depicts an exemplary user interface allowing the user to select one or more insurers from field 600 from which to request consumer information. For example, the user can highlight a desired selection and select the "NEXT" activatable icon. Additionally, the user interface contains a "PAYOR NOT LISTED" activatable icon 605 so that the user can type in a payor not listed in field 600. As mentioned, the present invention can contain data structures containing insurance carrier information and associated consumer information such that the user interface of FIG. 11 can be optional.

Figure 12:
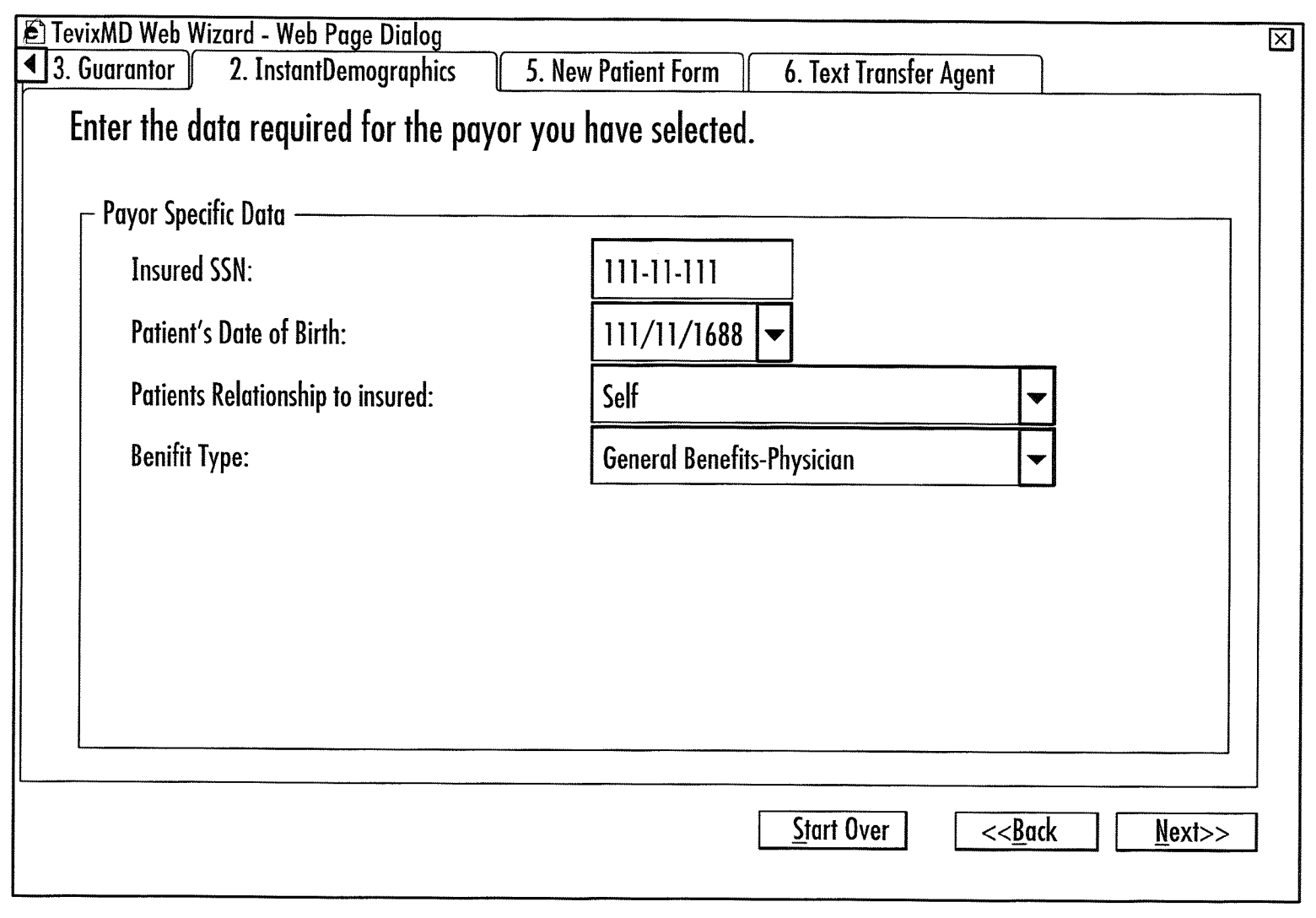

FIG. 12 depicts an exemplary user interface allowing the user to provide additional consumer insurance information in fields 610 to aid in the retrieval and verification of consumer insurance information from the insurer.

FIG. 13A depicts an exemplary user interface which can display retrieved consumer insurance information. For example, responsive to the user proceeding from the exemplary user interface of FIG. 12, i.e., activating the "NEXT" activatable icon, the exemplary user interface of FIG. 13A can be displayed to the user. Notably, the retrieved consumer insurance information corresponding to the selected consumer demographic information, and further corresponding to the consumer identifier, can be presented. Additionally, it should be appreciated that the consumer insurance information, as shown in field 500 of FIG. 13A, can include the patient's insurer, group number, identification number, the specific policy parameters such as co-pay amounts for various services, as well as the percentage of particular service expenses covered by the medical insurer.

Figure 13B:
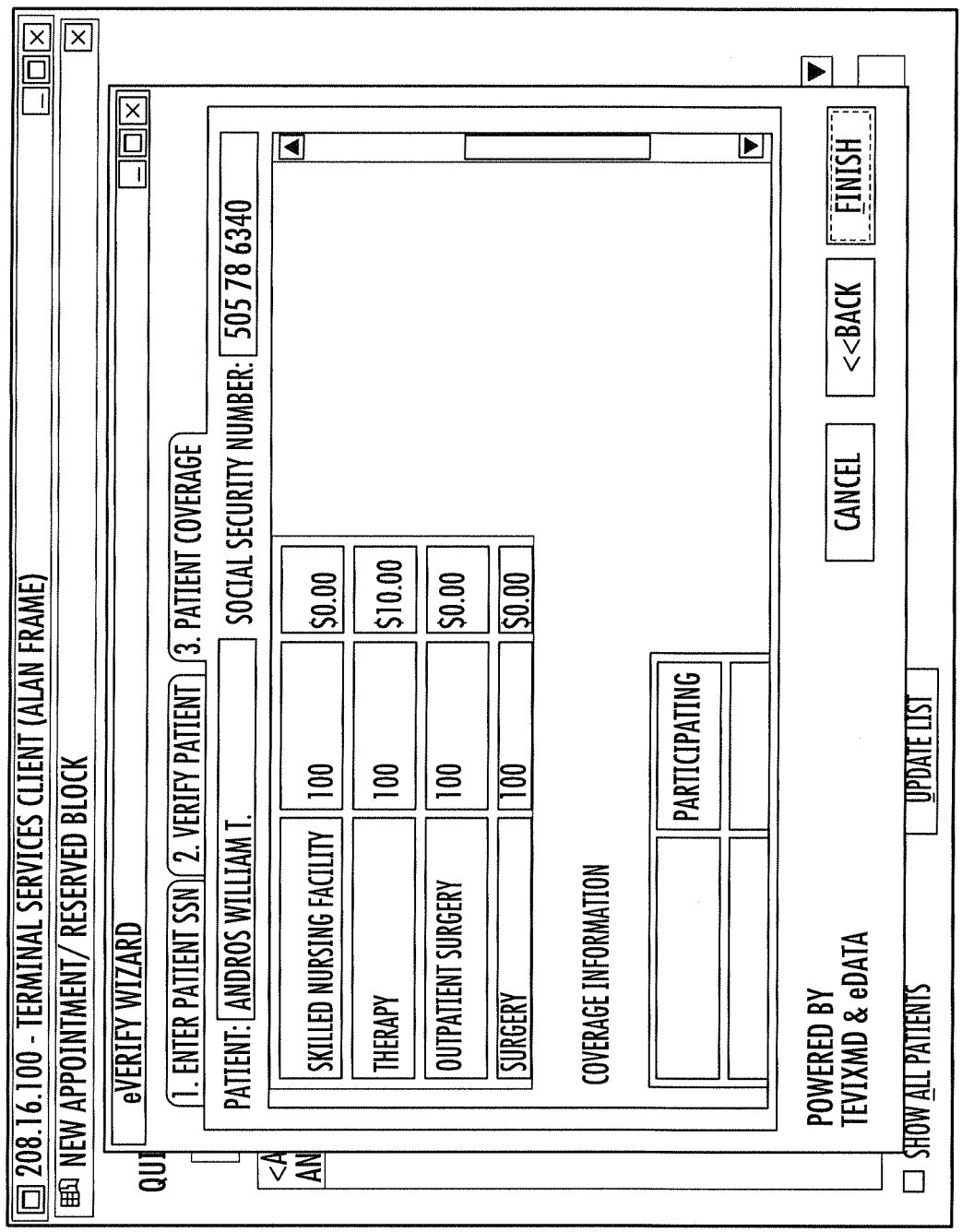
Figure 13D:
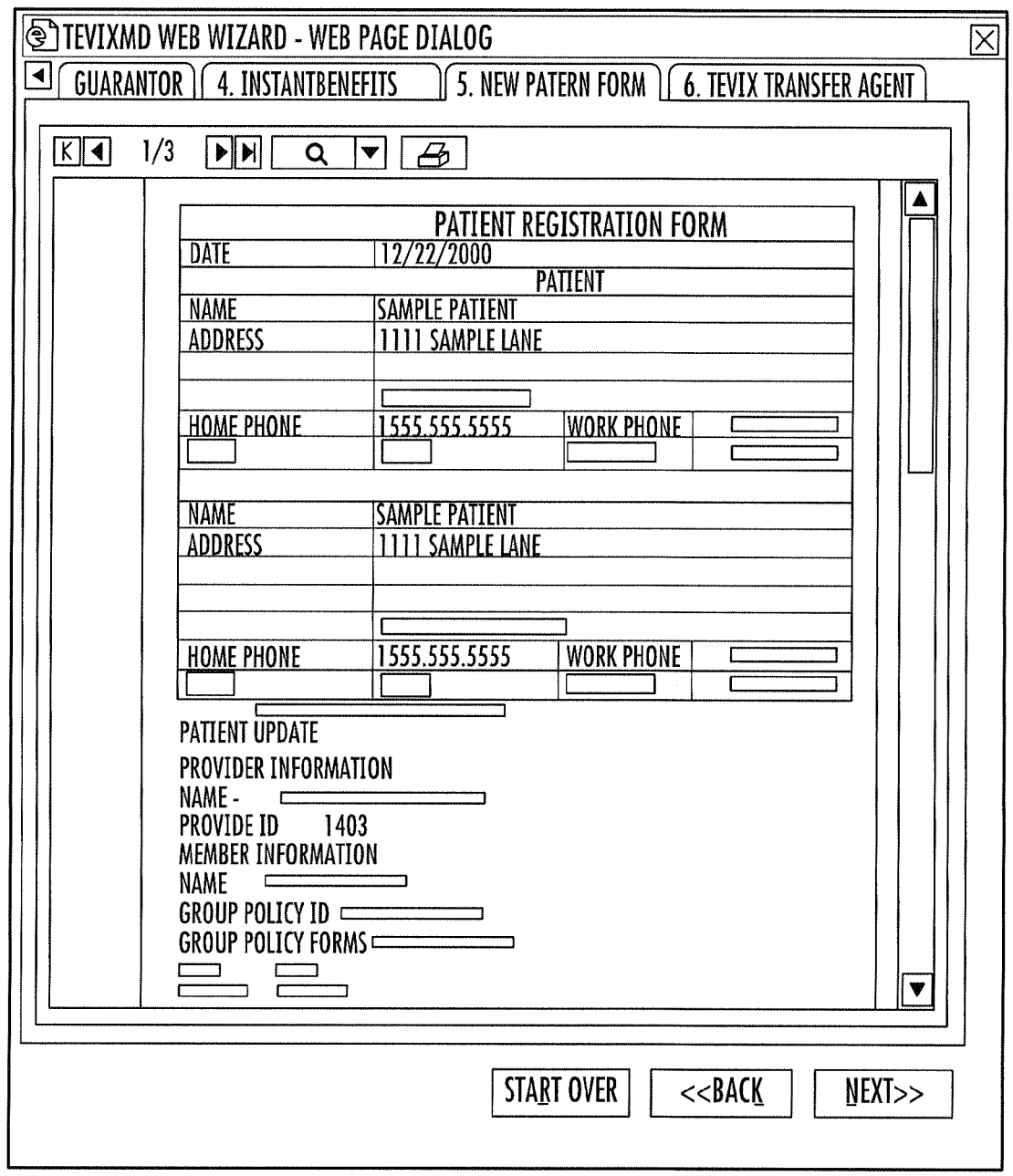

FIG. 13B, similar to FIG. 13A, depicts an exemplary user interface having a field 620 for displaying consumer insurance information, or other additional retrieved information. FIG. 13C depicts yet another exemplary user interface having a field 630 for displaying retrieved consumer insurance information. Notably, the user interface of FIG. 13C can be used to present consumer information which has been formatted using a markup language. FIG. 13D also depicts an exemplary user interface having a field 640 for displaying retrieved consumer insurance information.

FIG. 14 depicts an exemplary user interface having activatable icons 650 which allow the user to specify the computer program to which the transfer agent of the CIS will transfer any retrieved consumer information. Notably, this user interface can be displayed to the user during a registration process such that the CIS can store that information and need not ask the user for that information in the future. Alternatively, the CIS can present the exemplary user interface prior to each transfer of consumer information to the user's computer system. Regardless, the user can be presented with the exemplary user interface during an administration function available within the CIS.

FIGS. 15A and 15B depict exemplary insurance information for an individual. The exemplary insurance information is representative of the insurance information which can be retrieved by the invention disclosed herein.

The method described herein can be iterative such that the merchant can continue to request additional consumer information which the CIS has been programmed to provide. Further, it should be appreciated that the CIS can transfer different types of consumer information to one or more different computer programs within the merchant computer system. For example, the CIS can transfer demographic information to a scheduling computer program and insurance carrier information to a billing computer program. The consumer information also can be transferred to one or more user interfaces of the plurality of computer programs.

According to another aspect of the invention, the identity of the patient is checked in a computer-implemented method for determining the insurance coverage status for the patient. A set of patient identity information is created that can be used to obtain insurance information. The method can be used to correct or find missing data for the patient. A minimal amount of data from the patient is required to create a set of patient identity data and thereby the corresponding insurance coverage(s) for the consumer.

The method is shown in FIG. 16A-D as steps (a)-(l). The method begins with receiving consumer medical insurance information for the consumer from the consumer. The consumer medical insurance information comprises a plurality of consumer data items in a plurality of consumer medical insurance information fields. Each field corresponds to a different one of a plurality of attributes of the consumer and each data item comprises at least one character defining a character string. The consumer medical insurance information fields include at least one indentified insurance carrier field and at least one identity field for the consumer. See FIG. 16(*a*).

The process begins with the patient providing a set of consumer medical insurance information for them and possibly their spouse or child, if the spouse or child is the patient or if the spouse is the source of the insurance coverage. This is usually provided on a paper form but could be provided using a computer, the internet or over the phone. The consumer medical insurance information includes a plurality of consumer data items in a plurality of consumer medical insurance information fields, where each field corresponds to a different one of a plurality of attributes of the consumer and each data item comprises at least one character defining a character string. The data provided may include but is not limited to: first name, middle name, last name, social security number (SSN), date of birth (DOB), address, an alternate address if one is available, city, state, zip code (ZIP), and telephone number. Another complete set of data might be provided if the patient is not the person in whose name the insurance is issued. Also, any spouse data may also be obtained. The consumer medical insurance information will usually include at least one identified insurance carrier—the insurance carrier that the consumer or patient represents to be the carrier that is responsible for the patient's care, and possibly also an insurance identification number for the patient. These are shown as "ABC Ins. Co." and "12AAA33ED" in FIG. 16(*a*). The consumer medical insurance information will also include one or more identity fields of information that are used to identify the consumer, the patient or the spouse. These can include the social security number ("505-78-6330"), the first ("Bob"), middle ("Walker") and last ("Doe") names, and the date of birth ("Jan. 8, 1958"). Other fields of data can alternatively be used as identity fields, depending on which fields are believed to be the most useful and reliable to identify the patient.

Data from one or more of the identity fields from the consumer medical insurance information is sent to a plurality of network location(s) where identity information is stored. Different combinations of data fields from the consumer medical insurance information can be used to search. Certain fields of the consumer medical insurance information can be designated identity fields, which are fields that are determined or believed to be the most useful to identify the consumer. The identity fields can be the name, SSN, and DOB, although other fields such as address can also be useful identity fields. Search options include but are not limited to: 1) SSN, last name; 2) DOB, first name, last name; 3) year of birth, last name; 4) city, state, last name; 5) address; 6) year of birth, address; 7) city, state; 8) city, state, date of birth; 8) address, city, state, SSN; 9) last name, SSN, date of birth, Insurance ID; 10) insurance ID, SSN; 11) insurance ID, date of birth; and 12) insurance ID, last name. In the example, the social security number SSN ("505-78-6330") and last name ("Doe") can be used.

Using the subset of the consumer medical insurance information a complete set of consumer identity information for the consumer, the patient if different from the consumer, and possibly also the spouse is obtained. This information may be received from one or many network locations. There may be multiple searches conducted from the first search or using the data provided from the network locations. If the SSN is not provided or due to poor handwriting a search of the SSN does not match the patient name additional searches will be conducted using a different subset of the identity information, for example the patient's first name, last name and date of birth. A search may be conducted if necessary using the address such as street name, city, state and zip code.

The sources of identity information could be a single reliable source such as a credit bureau. In a preferred configuration multiple sources would be used which would consist of multiple reliable sources like credit bureaus, driver license data, and bank and bankruptcy data. These network locations are located remotely from one another, from the network location of the provider, and from the network location of the identified insurance carrier, and can be third party sources of identity information. The identity information that is received can be stored in a database such that for future searches for this consumer the information may be obtained from such a single identity information database in addition to or as an alternative to repetitive third party searches.

The search results can provide consumer identity data including but not limited to first name, middle name, last name, social security number, date of birth, address, address 2 (if applicable), city, state, zip code, telephone number, spouse first name, middle name, last name, social security number, date of birth, address, address 2 (if applicable), city, state, zip code, and telephone number.

One or more sets of consumer data is returned from one or more of the plurality of network identity information source locations, as shown in FIG. 16(*b*). In the example shown in FIG. 16(*b*), 9 different sets of data were returned from sources 1 through 9 of identity information based upon a search using a subset of the identity fields of the consumer medical insurance information. More or fewer sets of data might have been received from more or fewer network identity information source locations.

The consumer identity information that is returned from the network identity information source locations has data items in fields corresponding to a plurality of fields of the consumer medical insurance information and includes at least one identity field, such as the social security number. The identity information will often have a number of conflicting data items in one or more data fields. For example, in FIG. 16(*b*) the social security numbers from sources 5 and 9 differ from those provided by the patient and from the other sources. The dates of birth from sources 5, 8 and 9 differ from the remaining sources. The last name from source 8 differs from the other sources. The middle names from sources 1, 5, 8, and 9 are different, and there are several different first names. In the address field, the addresses from sources 5, 6 and 8 differ from the remaining sources. There are also differing data items in the city, state, ZIP, phone, and alias fields. The information that is returned from the identity information sources is checked on a field by field basis by comparing data in identity fields of the identity information that was received from the identity sources with data in corresponding identity fields of the consumer medical insurance information that was provided by the consumer.

As shown if FIG. 16(*c*), matching rules are then applied to store consumer identity information from ones of the network locations where the consumer identity information from the network locations satisfies the matching rules, and to eliminate the consumer identity information which does not satisfy the matching rules. The purpose of the matching rules is to eliminate data that is so different from the data provided by the consumer that it is deemed too unreliable to use further, and to store data that is sufficiently reliable for the next steps. Data from sources that satisfy the matching rules is stored for further use.

The matching rules can vary and can be determined on an empirical basis as the rules which return the best data. Examples of possible matching rules, without limitation, include:

a) seven of the nine digits of the SSN must match;
b) the first three characters of the first name must match;
c) the first five characters of the last name must match;
d) at least one of the name fields must match (first name, middle name, last name);
e) a name reversal is acceptable (Robert Thomas and Thomas Robert);
f) two of the three date of birth fields (month, day, year) must match;
g) the SSN and date of birth fields must have only digits and no spaces;
h) the date of birth must be a valid calendar date and not in the future;
i) the SSN is nine digits long;
j) the SSN passes a test that shows the number could be issued by the US government (for example, the SSN cannot be numbers like 111111111, or 000000000);
k) the address cannot have digits in the state field;
l) the zip code must be all digits and must be valid for the given state;
m) the city must be a valid city for the state and zip code;
n) the address must be be valid and deliverable by the postal service.

At least two of the three identity fields (SSN, name, date of birth) from a network identity information source location must satisfy the matching rules for the respective identity fields of the consumer medical insurance information before the matching rules are satisfied and the data from the source will be stored. Other matching rules are possible.

For example, in FIG. 16(*c*) the SSN from source 5 differs substantially from that provided by the consumer and so the data from this source is eliminated. The date of birth from source 8 is different and so the data from this source is eliminated. The date of birth from source 9 is different and so the data from this source is eliminated. Each digit of the SSN that was supplied by the patient is compared to the SSN provided from the network locations. The result is a set of data, shown in FIG. 16(d), that comprises data from network identity information source locations which satisfies the matching rules. This set of data will be used to search for insurance coverage status information.

Logic can be applied to determine corrected consumer data, as shown in the row labeled "Corrected" in FIG. 16(d). This is an optional step that can be used to create a best guess set of consumer identity data to send to possible insurers. As examples, misspelled names, incorrect SSN, missing or incorrect date of birth, and the like can be corrected. The correction can be accomplished by applying correction rules to the consumer identity information received from the network consumer identity information sources which satisfied the matching rules, and to the consumer medical insurance information to produce corrected consumer identity information including at least one identity field. If the key identity fields (name, DOB and SSN) did not satisfy the matching rules then the results from that source would not be used.

The invention uses a number of factors to determine the corrected data set. These factors include a reliability ranking of the data source, the number of sources that confirm the data, the age of the data, the data provided by the client and the environment in which the data was provided. When multiple sources are used a rating such as 1 to 10 can be assigned to each field depending upon how many of the sources provide matching data. A 10 can mean that all sources match and a 0 can mean that no sources match. In addition there must be at least two identity fields which match for the information from the network location to be used at all to determine the corrected data set. A reliability ranking of the data source can also be provided. For example, a government source such as driver's license data can be deemed to be more reliable than a private source for fields such as SSN and DOB, and an appropriate weighting of this data can be assigned. The data in each field is provided a ranking based on a combination of the above factors. The data with the highest ranking in each field is use for the corrected set. This same process can be used for all parties—patient, spouse, and responsible party if the patient is not the same person. The corrected data if obtained can be used for the initial set of searches for insurance coverage status, since this is the set that has been determined to be most reliable.

A superset of consumer identity information can be constructed with fields comprising data items from the consumer medical insurance information and data items from the consumer identity information which satisfies the matching rules, as shown in FIG. 16(e). The superset includes data items from fields of the sources that passed the matching rules. For example, two of the three key identity fields (name, SSN, DOB) must match. If a corrected set of data has been produced this corrected set of data can be included in the superset. The superset of data includes each different data item from the data set of FIG. 16(d). This includes a number of different fields of data, which can include first name, middle name, last name, social security number, date of birth, address, address 2 (if applicable), city, state, zip code, and telephone number and another complete set of data for the patient if the patient is not the person in whose name the insurance is issued. Also data for the spouse of the consumer or the patient can be obtained.

The method next requests insurer medical insurance information for the consumer, from the insurance carrier identified by the consumer ("ABC Ins. Co."). The request is made to a different network location remote from the network location of the provider. The request for insurer medical insurance information for the consumer from the identified insurance carrier is based upon data items from fields of the superset of consumer identity information of FIG. 16(e). The requested insurer medical insurance information includes at least coverage status information for the consumer for the identified insurance carrier and at least one identity field for the consumer. Requests can initially be made using the corrected data set, if a corrected data set is produced, as shown in FIG. 16(f). If a corrected set of data has not been produced, the method proceeds to send requests using combinations and permutations of data from the superset of FIG. 16(e), as shown in FIG. 16(g). The combinations and permutations can be generated by a processor programmed for this purpose.

Insurance information is requested from the indentified insurance carrier, in this example "ABC Ins. Co.", using a subset of the superset of data that is believed to be the most likely to be correct. For example the initial search may be conducted using the data fields of first name, last name, insured ID, and date of birth. If a corrected set of data has been generated, this would usually be sent first since the corrected set comprises the data thought to be most accurate. If coverage status information is obtained, data items from a plurality of fields corresponding to a plurality of fields of the consumer medical insurance information, including at least one identity field, are received from the identified insurance carrier. This is shown in FIG. 16(h). The matching rules are then applied to at least the identity fields of the insurer medical insurance information, and if the identity fields satisfy the matching rules, then coverage status of the additional insurance carrier is retained.

If the first request for information from the identified carrier is denied, or if no response is received, another request can be sent with a different subset of the data from the superset. For example, a second request can be based upon a second subset of the data from the superset, such as last name, date of birth and SSN. The searches can be prioritized by data type. The initial searches use at least one of the three identity data fields (name, SSN, date of birth). All combinations from different data fields (name, SSN, DOB, address, address 2, city, state, zip code, and telephone number) in the superset and permutations of data items within a field type (such as first name—Bob, Robert, Rob) are attempted. A processor that has been programmed for this purpose can be used to generate the different permutations and combinations for the requests. If a reply is received from the network location of the identified insurance carrier and the identity check fails then additional combinations and permutations are attempted until a response is received or all combinations or permutations have been tried.

Additional requests are made to insurance carriers that have not been identified by the patient, as shown in FIG. 16(i). These requests are made even if a positive coverage status is obtained from the carrier which was identified by the consumer. The purpose is to identify all insurers who have any responsibility for covering the consumer or the consumer's children, spouse, or domestic partner. The search procedures that are used for these additional carriers are the same as for the identified carrier and includes the step of using subsets of the superset of consumer identity information, and the corrected set if one was produced. All combinations and permutations are attempted for each carrier. If a reply is received from a network location and the identity check fails, then additional combinations and permutations are attempted until a response is received or until all combinations and permutations have been tried for that insurance carrier. The requests are sent to a plurality of insurance carriers, and most preferably, to all possible carriers for the patient so that a complete determination of the insurance coverage status for the patient is obtained. The results from the insurance carriers are received responsive to the requests, as shown in FIG. 16(j). All replies from the insurance carrier network locations which include identity fields are checked for an identity match, as shown in FIG. 16(k). The identity match is conducted using the matching rules, and can be applied to either the identity fields of the consumer medical insurance information or to the identity fields of the corrected data if such has been produced. A subset of data items from identity fields (Name, DOB, SSN) from the response from the network location(s) is compared to the corresponding identity fields in the superset of consumer data to confirm an identity match. Data that satisfies the matching rules is stored for later presentation to the provider or other interested party. Data that does not satisfy the matching rules is rejected as being not credible.

Figure 17A:
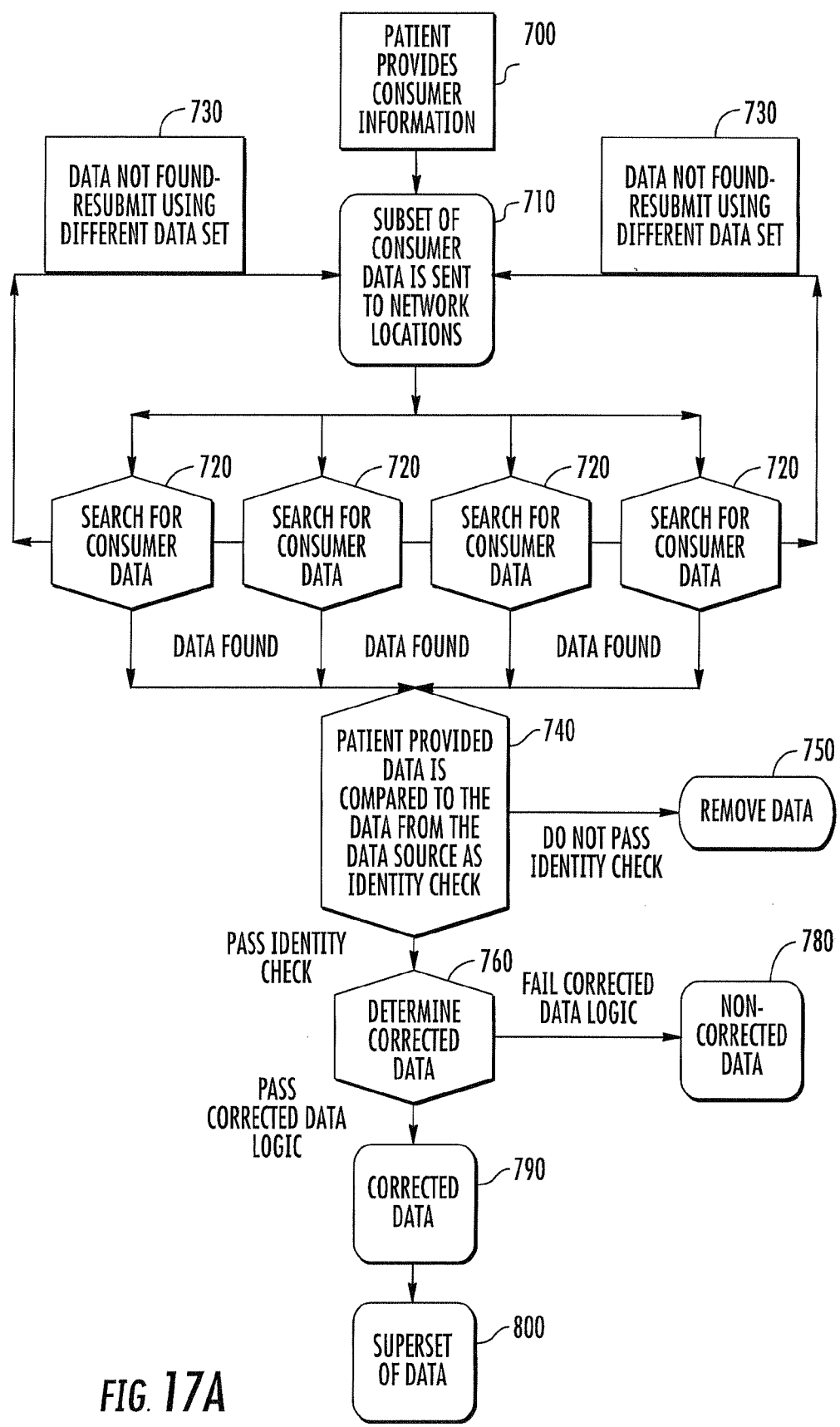
FIGS. 17A-B are a block diagram of a method for determining insurance coverage for a consumer.
Figure 17B:
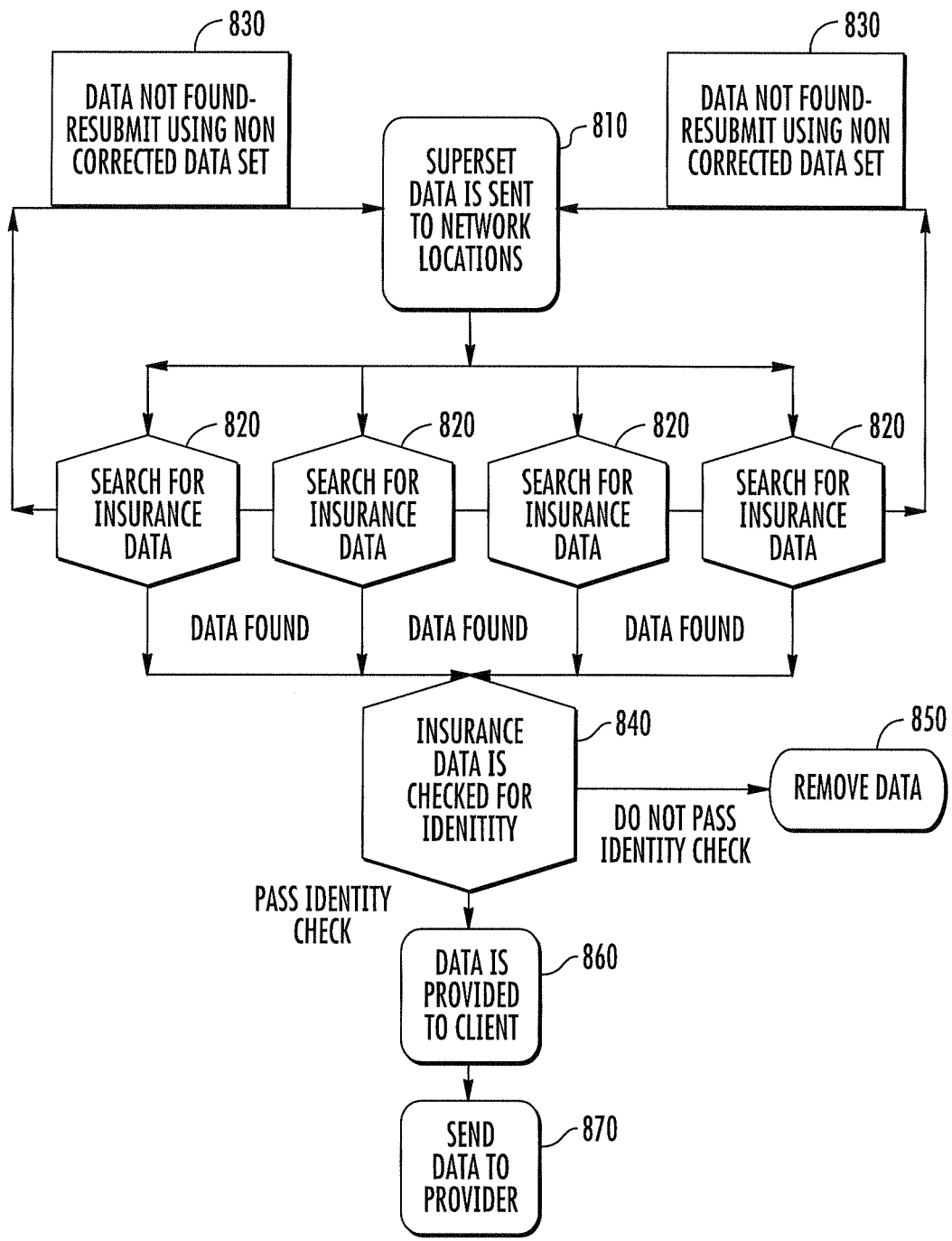

A block diagram illustrating the method of the invention is shown in FIG. 17(a)-(b). The method begins with a step 700 in which the consumer provides consumer medical insurance information, including consumer identity information. In step 710 a subset of the consumer medical insurance information, comprising identity information, is sent to network identity information locations to obtain identity information sufficient to identify the consumer. A search at the identity information network locations is performed at step 720. If data for the consumer is not found from a source, in step 730 requests can be resent using data from different fields of the consumer medical insurance information. If identity information for the consumer is found then the information received from the consumer identity data sources is compared using matching rules to respective fields of the consumer medical insurance information in step 740. Data from sources that does not satisfy the matching rules is discarded in step 750. Correction rules can be applied at step 760 to produce a set of corrected consumer data at step 760. Data that does not satisfy the correction rules is set aside from further use as corrected data in step 780.

In step 800 a superset of data is prepared using the consumer medical insurance information provide in step 700, corrected data if prepared in step 760, and the data received from the identity data sources and which passes the matching rules in step 740. Data from the superset is sent to insurance carrier network locations in step 810. This step can include and can begin with the network location of the insurance carrier that is identified in the consumer medical insurance information. The insurance carrier data is searched in step 820. If a response is not received, in step 830 different permutations of data from a field or combinations of data from different fields of the superset can be tried until a response is received or until all permutations and combinations have been tried. The data received from the insurance carriers can be checked using identity data and the matching rules in step 840. Data passing the matching rules is stored in step 860 and can be sent to the provider in step 870.

The invention can be carried out using one or more processors that have been programmed to perform the various steps of the invention. Data that is obtained or produced can be stored in appropriate data storage devices. A processor, for example, can be programmed to automatically generate requests to identity information sources or to insurers using different combinations and permutations of data, to receive responses from the identity information sources or the insurance carriers, to analyze the response or determine that a response was not received, and to continue generating new requests using different permutations and combinations until a response is received from the identity information source or from the carrier for that consumer, or until all combinations and permutations have been tried. The processor can also be programmed to apply the matching rules, and the rules for determining the corrected data set.

The present invention can be realized in hardware, software, or a combination of hardware and software. A method and system for retrieval and transfer of consumer information according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code, or notation; b) reproduction in a different material form.

The invention claimed is:

1. A computer-implemented method for determining and providing to a medical service provider medical insurance information corresponding to a consumer of medical services, the method comprising:

(a) receiving consumer medical insurance information for the consumer from the consumer, the consumer medical insurance information comprising a plurality of consumer data items in a plurality of consumer medical insurance information fields, wherein each field corresponds to a different one of a plurality of attributes of the consumer and each data item comprises at least one character defining a character string, the consumer medical insurance information fields including at least one identified insurance carrier field and at least one identity field for the consumer;

(b) obtaining consumer identity information for the consumer by searching information stored at a plurality of network locations of identity information sources located remotely from one another, from the network location of the medical service provider, and from the network location of the identified insurance carrier, the identity information sources comprising at least one selected from the group consisting of credit bureau data sources and driver license data sources, the search of consumer identity information being based upon data from at least one of the identity fields of the consumer medical insurance information, the consumer identity information comprising data items in fields corresponding to a plurality of fields of the consumer medical insurance information and including at least one identity field;

(c) comparing data in identity fields of the consumer identity information with data in corresponding identity fields of the consumer medical insurance information, and applying matching rules to store consumer identity information from ones of the network locations where the consumer identity information satisfies the matching rules, and to eliminate consumer identity information which does not satisfy the matching rules;

(d) creating a superset of consumer identity information with fields comprising data items from the consumer medical insurance information and data items from the consumer identity information which satisfies the matching rules; and further comprising a step of applying correction rules to the superset of the consumer identity information which satisfies the matching rules and to the consumer medical insurance information to produce corrected consumer identity information including at least one identity field that satisfy the matching rules;

(e) requesting from a network location source of insurer medical insurance information for the identified insurance carrier, the network location source of insurer medical insurance information for the identified insurance carrier being a different network location remote from the network location of the medical service provider, insurer medical insurance information for the consumer from the identified insurance carrier based upon a subset of data items from fields of the superset of consumer identity information, the requested insurer medical insurance information including at least a coverage status information for the consumer for the identified insurance carrier and at least one identity field for the consumer;

(f) if coverage status information is obtained, receiving from the identified insurance carrier data items from a plurality of fields corresponding to a plurality of fields of the consumer medical insurance information including the at least one identity field, and applying the matching rules to at least the identity fields of the insurer medical insurance information, and if the identity fields satisfy the identity rules, storing coverage status of the identified insurance carrier;

(g) if coverage status information is not obtained from the identified insurance carrier responsive to the request, or if the received insurer medical insurance information does not satisfy the matching rules, automatically generating a different combination or permutation of data items from the superset and repeating the requesting step using the different combination or permutation of data items, and repeating the applying matching rules step for any received insurer medical insurance information, until coverage status information is obtained from the identified insurance carrier which satisfies the matching rules or until all combinations and permutations have been tried;

(h) requesting insurer medical insurance information from a plurality of additional network location sources of insurer medical insurance information, the requested insurer medical insurance information including coverage status for a plurality of additional insurance carriers and at least one identity field for the consumer, the request being based upon data items from a subset of fields of the superset of consumer identity information;

(i) if coverage status information is obtained from an additional insurance carrier, receiving from the additional insurance carrier data items from a plurality of fields corresponding to a plurality of fields of the consumer medical insurance information including the at least one identity field, and applying the matching rules to at least the identity fields of the insurer medical insurance information, and if the identity fields satisfy the identity rules, storing the coverage status of the additional insurance carrier;

(j) if coverage status information is not obtained from an additional insurance carrier responsive to the request, or if the received insurer medical insurance information does not satisfy the matching rules, automatically generating a different combination or permutation of data items from the superset and repeating the requesting step using the different combination or permutation of data items, and repeating the applying matching rules step for any received insurer medical insurance information, until coverage status information is obtained from the additional insurance carrier which satisfies the matching rules or until all combinations and permutations have been tried;

(k) wherein steps (a)-(j) are performed by a computer processor.

2. The method of claim 1, wherein the step of requesting insurer medical insurance information for the identified insurance carrier is based upon a subset of the corrected consumer identity information.

3. The method of claim 1, wherein the step of requesting insurer medical insurance information for the plurality of additional insurance carriers is based upon a subset of the corrected consumer identity information.

4. The method of claim 1, wherein the consumer identity information is third party consumer identity information.

* * * * *